United States Patent [19]
Odam et al.

[11] Patent Number: 5,825,360
[45] Date of Patent: Oct. 20, 1998

[54] METHOD FOR ARRANGING WINDOWS IN A COMPUTER WORKSPACE

[75] Inventors: Seth Tobin Odam, Palo Alto; James Riddle Harker, Los Altos; Joseph G. Ansanelli, Palo Alto, all of Calif.; John Linehan Welde, Jr., Pope AFB, N.C.

[73] Assignee: Apple Computer, Inc., Cupertino, Calif.

[21] Appl. No.: 921,849

[22] Filed: Sep. 2, 1997

Related U.S. Application Data

[63] Continuation of Ser. No. 418,760, Apr. 7, 1995, abandoned.

[51] Int. Cl.$^6$ ........................................................ G06F 3/00
[52] U.S. Cl. ........................................... 345/344; 345/340
[58] Field of Search .................................. 345/340, 346, 345/342, 343, 326, 339, 348, 329, 728, 344, 330, 331, 332, 333, 334, 335, 336, 337, 338, 349, 350–352

[56] References Cited

U.S. PATENT DOCUMENTS

| | | | |
|---|---|---|---|
| 4,769,636 | 9/1988 | Iwami et al. | 340/724 |
| 4,819,189 | 4/1989 | Kikuchi et al. | 364/521 |
| 4,954,818 | 9/1990 | Nakane et al. | 340/721 |
| 5,001,469 | 3/1991 | Pappas et al. | 340/721 |
| 5,129,055 | 7/1992 | Yamazaki et al. | 395/158 |
| 5,179,655 | 1/1993 | Noguchi et al. | 395/158 |
| 5,386,505 | 1/1995 | Beattie et al. | 395/158 |
| 5,412,776 | 5/1995 | Bloomfield et al. | 345/344 |
| 5,463,728 | 10/1995 | Blalit et al. | 395/158 |
| 5,469,540 | 11/1995 | Powers, III et al. | 345/340 |
| 5,522,020 | 5/1996 | Narayanaswami | 395/133 |
| 5,602,996 | 2/1997 | Powers, III et al. | 345/340 |
| 5,689,666 | 11/1997 | Berquist et al. | 345/345 |

OTHER PUBLICATIONS

Cascade Feature as printed from Microsoft Help Facility of Microsoft Windows 95, Microsoft Corp., Redmond, Washington (1995).

*Primary Examiner*—Raymond J. Bayerl
*Assistant Examiner*—Steven P. Sax
*Attorney, Agent, or Firm*—Beyer & Weaver, LLP

[57] ABSTRACT

A method for arranging windows in a workspace on a computer display screen. The method includes the steps of assigning, using a central processing unit, a priority to each of a first plurality of windows in the workspace according a predefined criteria, a selected window having the highest priority. The method further includes the step of indenting by an indentation distance value from a reference position in the workspace on the computer display screen each of the first plurality of windows, the window having the lowest priority being positioned the closest to the reference position, the window having the highest priority being positioned the furthest from the reference position and in the visual foreground of the workspace on the computer display screen.

23 Claims, 14 Drawing Sheets

METHOD FOR ARRANGING WINDOWS IN A COMPUTER WORKSPACE

This is a continuation of application Ser. No. 08/418,760 filed Apr. 7, 1995, now abandoned

BACKGROUND OF THE INVENTION

This invention relates generally to computer systems and to graphical user interfaces for computer systems. More particularly, the present invention relates to apparatus and methods for arranging windows in a computer workspace.

Windows are often used with computer systems implementing graphical user interfaces (GUIs). Many people find that computers having GUIs are easier to learn and use than comparable computers without GUIs. Computers having GUIs include desktop units, such as the popular Apple™ Macintosh™ and IBM™-compatible computers, notebooks and subnotebooks, such as the popular Apple™ Powerbooks™ and IBM™ ThinkPads™, as well as pen-based computers such as the Apple™ Newton™. For ease of understanding and without limiting the scope of the invention, a Power Macintosh™ computer system manufactured by Apple™ Computer Inc. of Cupertino, Calif. is selected for illustration purposes. However, it should be noted that the discussion below is equally applicable to computers of other makes and models.

FIG. 1 shows a typical prior art GUI screen on a computer display screen 10. On an Apple Power Macintosh, computer display screen 10 often includes a desktop image 14 which is produced by a Macintosh operating system. Desktop image 14 often includes a menu bar 18 and a desktop display area 20. In the example of FIG. 1, desktop display area 20 represents the computer workspace, i.e. the space within which there may exist one or more windows. Within desktop display area 20, there are also shown a number of icons 22, 24 and 26, representing different objects. For example, icon 22 represents a hard disk drive, icon 24 represents a "trash can" in which files can be deposited to be deleted, and icon 26 represents a folder entitled "desk stuff," which may contain application programs and files of various types.

Menu bar 18 preferably includes a number of menu labels 28, 30, and 32 for implementing pop down menus, as are well known to Macintosh users. Desktop image 14 also includes a screen cursor shown in the form of an arrow 34. The screen cursor works in cooperation with a pointing device, for example, a trackball, a mouse, a joystick, special keys on a computer keyboard, or the like. As is well known to those of skill in the art, the screen cursor may be moved to different positions on computer display screen 10 and may assume different forms.

There is also shown in FIG. 1 an window 16 within desktop image 14. Window 16 represents an instance of a utility program known as Finder™, also manufactured by Apple Computer, Inc. of Cupertino, Calif. At the top of window 16, shown is a title bar 36. As shown in FIG. 1, title bar 36 identifies the current window as "A Folder." Each window has associated with it a window display area 37 within which information may be entered, displayed, and/or manipulated. Optional vertical scroll bar 38 and horizontal scroll bar 40 are preferably located at the vertical and horizontal edges of window 16. Window 16 can be moved around the computer workspace, represented in FIG. 1 by desktop display area 20, preferably by dragging on title bar 36. Window 16 can also be resized, preferably by dragging a size box 42 to expand or contract window 16. Further, window 16 can also be closed, preferably by clicking on a close box 44 in the upper left corner of window 16.

Windows sometimes include information regarding the software currently under use and the current system capacity. In FIG. 1, textual information box 46 in window 16 indicates that there is currently 0 item in "A Folder," 53.2 megabytes of total memory capacity on a disk storage device, of which 9.7 megabytes of memory is available. The functions and use of the aforementioned items, which are typical in a GUI environment, are well known to those familiar with the Apple™ Macintosh™.

For the purposes of the present invention, a window is any discrete portion of a computer display screen, typically although not necessarily rectangular in shape, in which related data may be entered, displayed, and/or manipulated. In a typical GUI screen, there may exist a plurality of windows at any given time. A window further has its own workspace, i.e. the area within which it is confined. In the example of FIG. 1, desktop display area 20 itself defines the workspace of window 16. In other words, window 16 may be moved to any location within the workspace defined by desktop display area 20. In other situations, a window may be confined within another window or within a predefined portion of another window. In these cases, the workspace for that window is no longer the entire desktop display area 20 but is limited to the actual area inside another window within which that window is confined.

In a typical graphical user interface (GUI) display, there usually are multiple windows simultaneously opened by the user. At any given time, the user typically accesses, or selects, only one out of the multiple windows in the GUI display. The window currently being accessed by the user is typically brought to the visual foreground, i.e. placed on top of other windows, to display its information to the user in an unobstructed manner. When a window is brought to the visual foreground and placed on top of other windows, some windows will be placed in the visual background and overlapped, either partially or completely, by the window in the visual foreground.

When a window is placed in the visual background, there is a chance that background window may be completely overlapped by the window in the visual foreground. When completely overlapped, that background window is in effect hidden from the user. If there are multiple windows in the display screen, it is often the case that a window so hidden in the visual background may become forgotten by the user. The problem of having multiple windows opened simultaneously, some of which may be hidden and forgotten by the user, is exacerbated by increasingly sophisticated software that employ a large number of data windows to organize and display their data. Even if the hidden window is not forgotten, access to that hidden window is nevertheless inconvenienced because the user can no longer click on an unobstructed part of that window to bring it to the visual foreground. As is well known to users of graphical user interfaces, such a hidden window can typically be accessed by, for example, moving or closing the obstructing window(s), or by retracing the steps that originally opened that obstructed window.

In certain applications, a display screen may be divided into many different, discrete workspaces, each of which may have within its boundaries a plurality of windows. When the number of windows rises above a certain threshold, say twenty, human users find it difficult to rely on memory to keep track of the number of windows currently being opened as well as the information associated with each window. To help the user remember the windows currently opened in a workspace and to facilitate ease of access, it is desirable that windows are arranged such that at least a portion of each window is unobstructed and available for selection, i.e. for clicking on a visible portion of the window to bring it to the foreground, by the user at all times.

Consequently, what is needed is an improved apparatus and method capable of arranging windows in a workspace such that each window remain at least partially visible to the user for quick identification and access.

SUMMARY OF THE INVENTION

The invention relates to a method for arranging windows in a workspace on a computer display screen. The method includes the steps of assigning, using a central processing unit, a priority to each of a first plurality of windows in the workspace according a predefined criteria, an active window having the highest priority. The method further includes the step of indenting by an indentation distance value from a reference position in the workspace on the computer display screen each of the first plurality of windows, the window having the lowest priority being positioned the closest to the reference position, the window having the highest priority being positioned the furthest from the reference position and in the visual foreground of the workspace on the computer display screen.

In another aspect, invention relates to a method for arranging windows in a workspace on a computer display screen, which includes the steps of assigning, using a digital computer, a priority to each of a plurality of windows in the workspace according to a predefined criteria. The method further includes the step of arranging the plurality of windows in the workspace such that a window of the plurality of windows having the lowest priority is placed the closest to a reference position, a window of the plurality of windows having the highest priority is placed the furthest from the reference position and in the visual foreground, wherein at least a portion of the each of the plurality of windows is unobstructed.

In another aspect, the invention relates to an apparatus for arranging windows in a workspace on a computer display screen, which includes means for assigning a priority to each of a plurality of windows in the workspace according to a predefined criteria and means for arranging the plurality of windows in the workspace such that a window of the plurality of windows having the lowest priority is placed the closest to a reference position, a window of the plurality of windows having the highest priority is placed the furthest from the reference position and in the visual foreground, wherein at least a portion of each of the plurality of windows is unobstructed.

DESCRIPTION OF THE PREFERRED EMBODIMENT

Physical Embodiment

It should be noted that the invention employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, windows, workspace, objects, or the like. It should be remembered, however, that all of these and similar terms are to be associated with the appropriate physical quantities and are merely convenient labels applied to these quantities.

Further, the manipulations performed are often referred to in terms, such as identifying, selecting, dragging, or dropping. In any of the operations described herein that form part of the present invention, these operations are machine operations. Useful machines for performing the operations of the present invention include general purpose digital computers or other similar devices. In all cases, there should be borne in mind the distinction between the method of operations in operating a computer and the method of computation itself. The present invention relates, in part, to method steps for operating a computer in processing electrical or other physical signals or quantities to generate other desired physical signals or quantities.

The present invention also relates to an apparatus for performing these operations. This apparatus may be specially constructed for the required purposes, or it may be a general purpose computer selectively activated or reconfigured by a computer program stored in the computer. Although a particular computer may be selected for illustration purpose, the processes presented herein are not inherently related to any particular computer or other apparatus. In particular, various general purpose machines may be used with programs written in accordance with the teachings herein, or a more specialized apparatus may be used to perform the required method steps. The required structure for a variety of these machines will appear from the description given below.

Architecture and Operation of the Apparatus and Method

Figure 2:
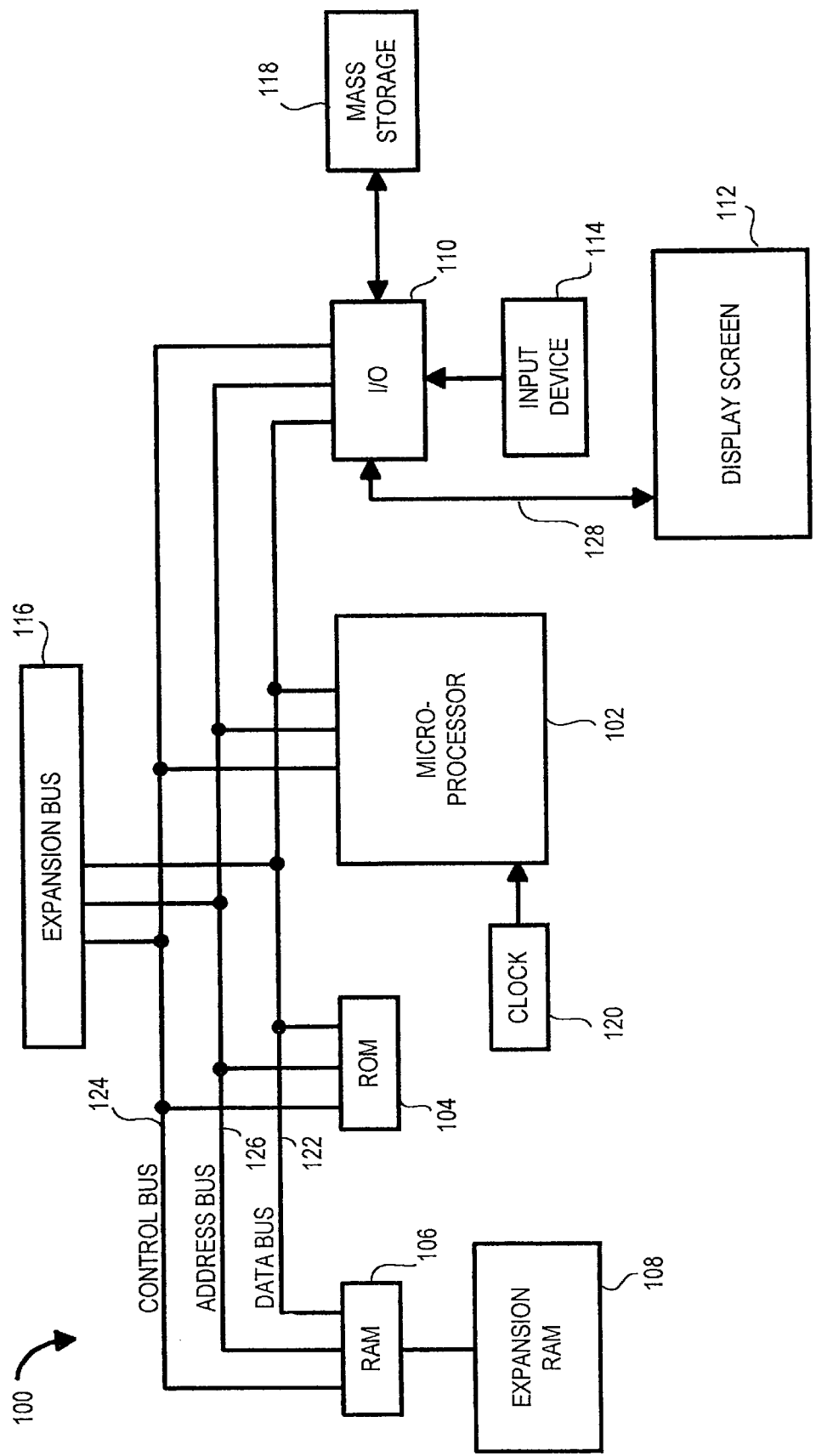
FIG. 2 shows a general purpose computer system for implementing the present inventive method.

FIG. 2 shows a general purpose computer system for implementing the present inventive method. Referring to FIG. 2, a computer system 100 in accordance with the present invention includes a central processing unit (CPU) 102, read only memory (ROM) 104, random access memory (RAM) 106, expansion RAM 108, input/output (I/O) circuitry 110, display assembly 112, input device 114, and expansion bus 116. Computer system 100 may also optionally include a mass storage unit 118 such as a disk drive unit or nonvolatile memory such as flash memory and a real-time clock 120.

CPU 102 is preferably a commercially available, single chip microprocessor such as one of the Intel X86 or Motorola 680XX family of chips, and is preferably a reduced instruction set computer (RISC) chip such as the PowerPC™ microprocessor available from Motorola, Inc. CPU 102 is coupled to ROM 104 by a data bus 122, control bus 124, and address bus 126. ROM 104 contains the basic operating system for the computer system 100. CPU 102 is also connected to RAM 106 by busses 122, 124, and 126 to permit the use of RAM 106 as scratch pad memory. Expansion RAM 108 is optionally coupled to RAM 106 for use by CPU 102. CPU 102 is also coupled to the I/O circuitry 110 by data bus 122, control bus 124, and address bus 126 to permit data transfers with peripheral devices.

I/O circuitry 110 typically includes a number of latches, registers and direct memory access (DMA) controllers. The purpose of I/O circuitry 110 is to provide an interface between CPU 102 and such peripheral devices as display assembly 112, input device 114, and mass storage 118.

Display assembly 112 of computer system 100 is an output device. In the case of certain computers, such as the Apple™ Newton™, display assembly 112 also serves as a part of the input device. When operating as an input device, a position-sensing apparatus disposed on the surface of display assembly 112 works in cooperation with input device 114 to receive data input from the user. Accordingly, it is coupled to I/O circuitry 112 by a data bus 128. When operating as an output device, the display assembly 112 receives data from I/O circuitry 110 via bus 128 and displays that data on a suitable screen. Note that unless display assembly 112 serves an input function, it is not absolutely necessary that data bus 128 be bi-directional.

The screen for display assembly 112 can be a device that uses a cathode-ray tube (CRT), liquid crystal display (LCD), or the like, of the types commercially available from a variety of manufacturers. Input device 114 can be a keyboard, a mouse, a stylus working in cooperation with a position-sensing display, or the like. Alternatively, input device can be an embedded RF digitizer activated by an "active" RF stylus. Therefore, as used herein, the term input device will refer to any mechanism or device for entering data and/or pointing to a particular location on a screen of a computer display. The aforementioned input devices are available from a variety of vendors and are well known in the art.

Some type of mass storage 118 is generally considered desirable. However, mass storage 118 can be eliminated by providing a sufficient amount of RAM 106 and expansion RAM 108 to store user application programs and data. In that case, RAMs 106 and 108 can optionally be provided with a backup battery to prevent the loss of data even when computer system 100 is turned off. However, it is generally desirable to have some type of long term mass storage 118 such as a commercially available hard disk drive, nonvolatile memory such as flash memory, battery backed RAM, PC-data cards, or the like.

In operation, information is inputted into the computer system 100 by typing on a keyboard, manipulating a mouse or trackball, or "writing" on a tablet or on position-sensing screen of display assembly 112. CPU 102 then processes the data under control of an operating system and an application program stored in ROM 104 and/or RAM 16. CPU 102 then typically produces data which is outputted to the display assembly 112 to produce appropriate images on its screen.

Expansion bus 116 is coupled to data bus 122, control bus 124, and address bus 126. Expansion bus 116 provides extra ports to couple devices such as modems, display switches, microphones, speakers, etc. to CPU 102.

Figure 3:
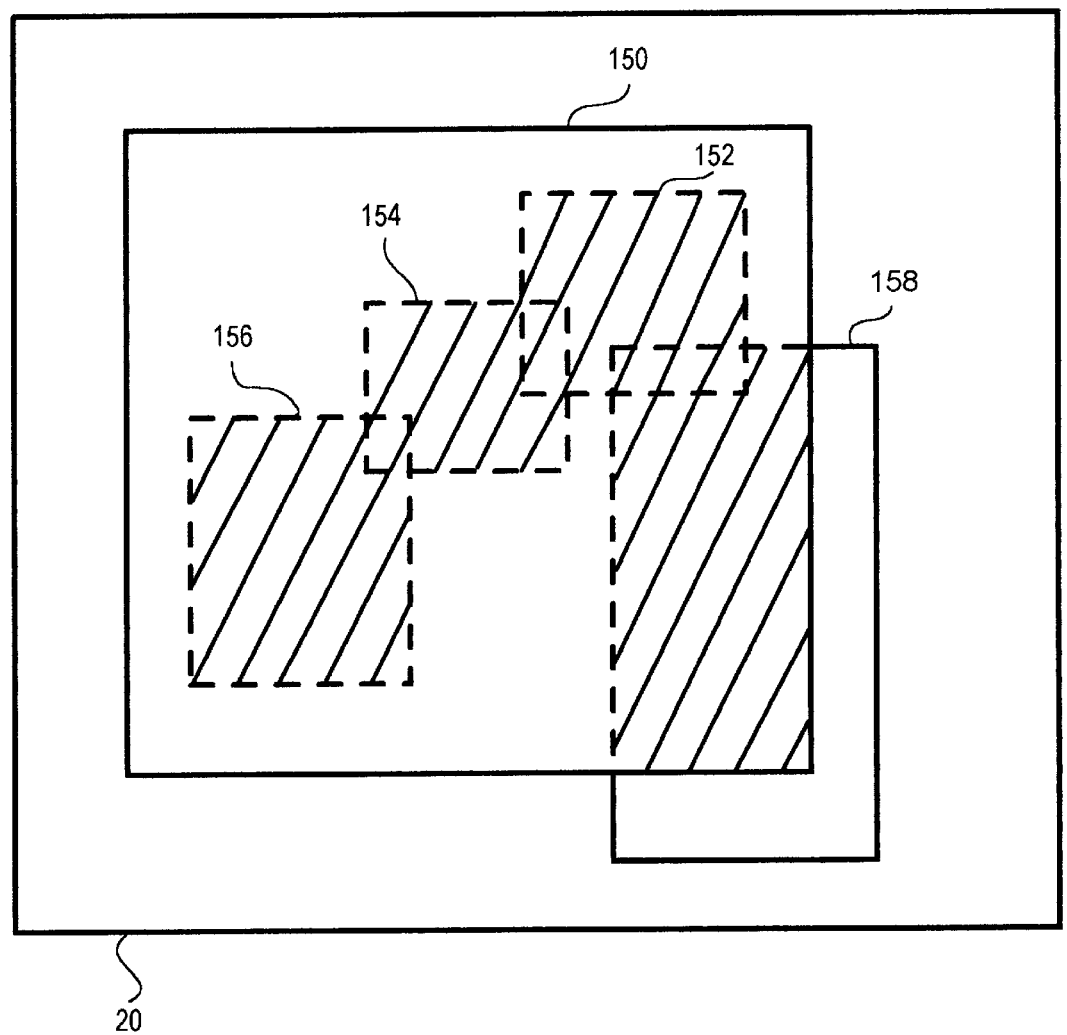
FIG. 3 illustrates graphically the concept of overlapping windows.

FIG. 3 illustrates graphically the concept of overlapping windows. As mentioned earlier, there may exist a plurality of windows at any given time on a typical GUI display screen, some of which may be overlapping with one another. Overlapping windows occur when many windows representing files and applications are simultaneously present. As is well known to GUI users, not all windows present on a display screen are active at any given time. It is often the case that as few as one window is typically active and in the visual foreground at any given time. Typically, the window in the foreground is the window last activated or a previously activated and inactive window that has been selected to bring to the foreground. When a window is in the visual foreground, it is not obscured, either partially or wholly, by any other windows. On the other hand, a window in the visual background may be obscured, either wholly or partially, by at least one other window. To facilitate discussion of the overlapping window concept, some terms need to be clarified. A window A is said to overlap a window B when window A is in the visual foreground, partially or completely obscuring window B. Window B is said to be overlapped by window A when part or all of window B is obscured by window A.

As shown in the example of FIG. 3, there are five windows 150, 152, 154, 156, and 158 present in desktop display area 20. For the purposes of illustration, assume for the moment that window 150 has most recently been selected for data input and is presented to the user in the visual foreground. Window 150 may represent, for example, a word processor application. Windows 152, 154, 156, and 158, not being selected by the user for operation, stay in the background. Depending on their screen locations relative to the selected window, those windows may be overlapped, partially or completely, by selected window 150 in the prior art. In fact, windows 152, 154, and 156 are completely overlapped by selected window 150 in the example of FIG. 3. The completely overlapped windows 152, 154, and 156 are not visible to the user and are represented by the shaded areas in FIG. 3. Furthermore, unless the user manually moves selected window 150 to a different location in the workspace to reveal underlying windows 152, 154, and 156, it is frequently the case in the prior art that those windows 152, 154, and 156 would remain hidden from view in the visual background and possibly be forgotten by the user. On the other hand, window 158 is only partially obstructed from view. The non-overlapped portion of window 158 is still visible to the user. Consequently, window 158 can be selected for operation and brought to the visual foreground simply by clicking on its visible, non-overlapped portion.

Figure 4:
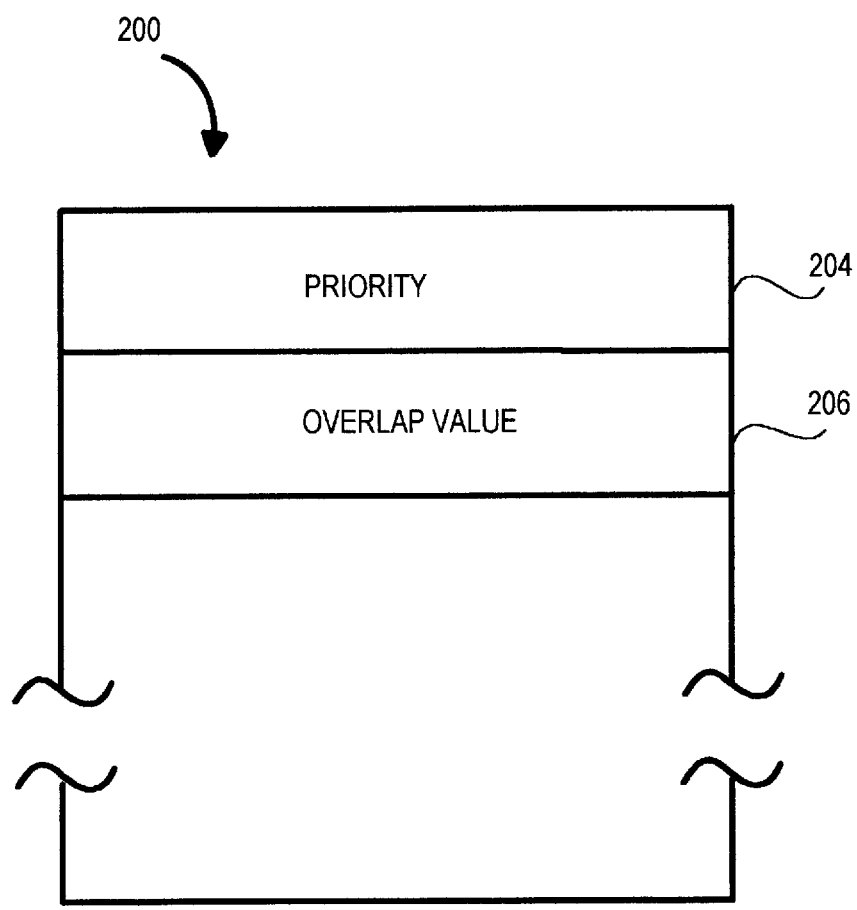
FIG. 4 shows in symbolic form the data structure associated with each window in accordance with one aspect of the present invention.

FIG. 4 shows in a symbolic form the data structure associated with each window in accordance with one aspect of the present invention. In FIG. 4, a data structure 200 includes a priority field 204 and an overlap value field 206. Priority field 204 represents the priority number of a particular window relative to other windows in the workspace. In a given workspace, each window has a unique priority number: no two windows in a workspace may have the same priority number. The priority number is initially assigned to each window according to some predefined criteria, e.g. the relative time of each window's creation, a user's particular preference, the relative importance of each window, and the like. In the specific embodiment, the selected window, i.e. the one in the visual foreground, always has the highest priority, e.g. a priority number of 1. Further, in the specific example chosen for illustration, the smaller a window's priority number, the higher in priority that window has. For example, a window with a priority number of 3 is higher in priority than a window having a priority number of 4.

Overlap value 206 of the window with the lowest priority is always 0. For a given window other than the window with the lowest priority, overlap value 206 is either 0 if it does not overlap any window having a lower priority or 1 greater than the maximum of [overlap value of all windows that both have a lower priority than the given window and being overlapped by the given window].

Figure 5A:
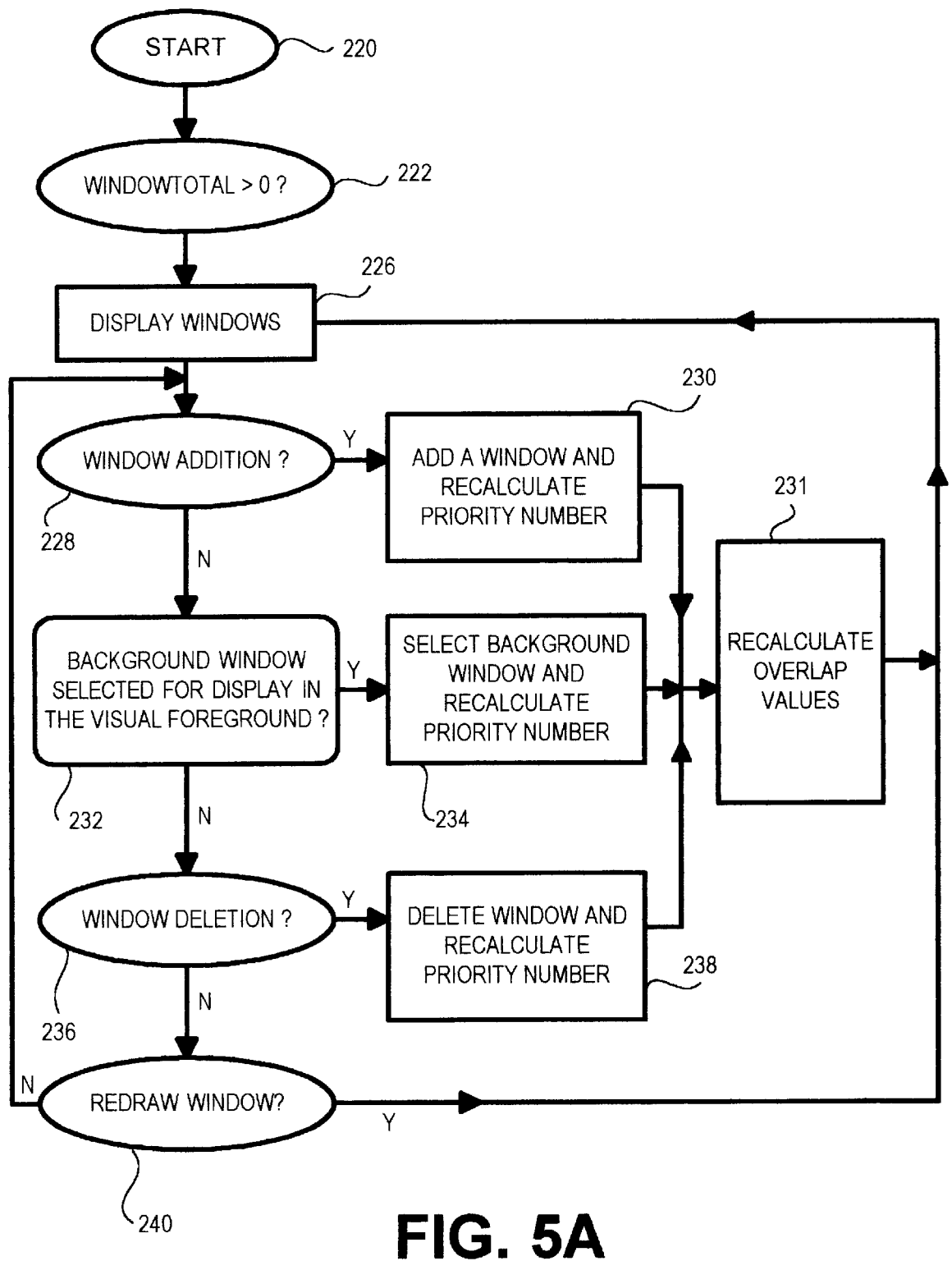
FIG. 5A shows in a simplified flowchart format the steps involved in the method for arranging windows in a computer workspace in accordance with one aspect of the present invention.

As discussed, windows may be wholly obscured and forgotten when displayed in accordance with prior art methods. In contrast, the present inventive method ensures that each window in the workspace is at least partially visible for user identification and selection. FIG. 5A shows in a simplified flowchart format the steps involved in the method for arranging windows in a computer workspace in accordance with one aspect of the present invention.

FIG. 5A starts at step 220. From step 220, the method proceeds to step 222 to ascertain whether the total number of windows to be displayed in a workspace is greater than zero. In this specific embodiment, the determination in step 222 is performed by testing whether a global variable WindowTotal, which always tracks the total number of windows to be displayed in a workspace, is greater than zero. If the total number of windows to be displayed is less than or equal to zero (as determined in step 222), the method proceeds to step 224, representing the end of the steps of FIG. 5A, since there is no window to be displayed. On the other hand, if the total number of windows to be displayed is greater than zero (as determined in step 222), the method proceeds to step 226 to display windows in accordance with the inventive method.

From step 226, the method proceeds to step 228 to check whether the user desires to add a new window. Depending on the particular application program, the user may indicate his or her desire to add an additional window in the workspace by selecting a menu item, double clicking on an icon, or engaging other known methods of indicating that a new window is to be added. If window addition is desired (as determined in step 228), the method proceeds to step 230 to add a new window and to recalculate the priority number of each window in the workspace. From step 230, the method proceeds to step 231 to recalculate the overlap values of the windows affected and then returns to step 226 to display the windows, including the window newly added in step 230. On the other hand, if window addition is not desired (as determined in step 228), the method proceeds to step 232 to check whether a background window is selected.

In step 232, a background window is selected when the user indicates that he or she wishes to bring a background window to the visual foreground. If it is determined in step 232 that a background window is selected, the method proceeds to step 234 to select the background window and to recalculate the priority number of existing windows. From step 234, the method proceeds to step 231 to recalculate the overlap values of the windows affected and then returns to step 226 to display all windows as previously mentioned.

On the other hand, if a background window is not selected (as determined in step 232), the method proceeds to step 236 to check whether the user wishes to delete a window. Again, depending on the specific application program involved, window deletion may be made by clicking on the window's close box, choosing a menu item, or engaging in any other known method for indicating that the user wishes to delete a window. If it is determined that a window is to be deleted (as determined in step 236), the method proceeds to step 238 to delete the window chosen for deletion and to recalculate the priority number of remaining windows. From step 238, the method proceeds to step 231 to recalculate the overlap values of the windows affected and then returns to step 226 to display the windows as previously mentioned.

On the other hand, if window deletion is not desired (as determined in step 236), the method proceeds to step 240 to ascertain whether the user desires to redraw the existing windows. If the user desires to redraw the existing windows (as determined in step 240), the method returns to step 226 to display all windows as previously mentioned. On the other hand, if the windows do not need to be redrawn (as determined in step 240) the method returns to step 228 to continue looping and detecting whether any of the window addition, background window selection, window deletion, or redraw windows steps is desired.

Figure 5B:
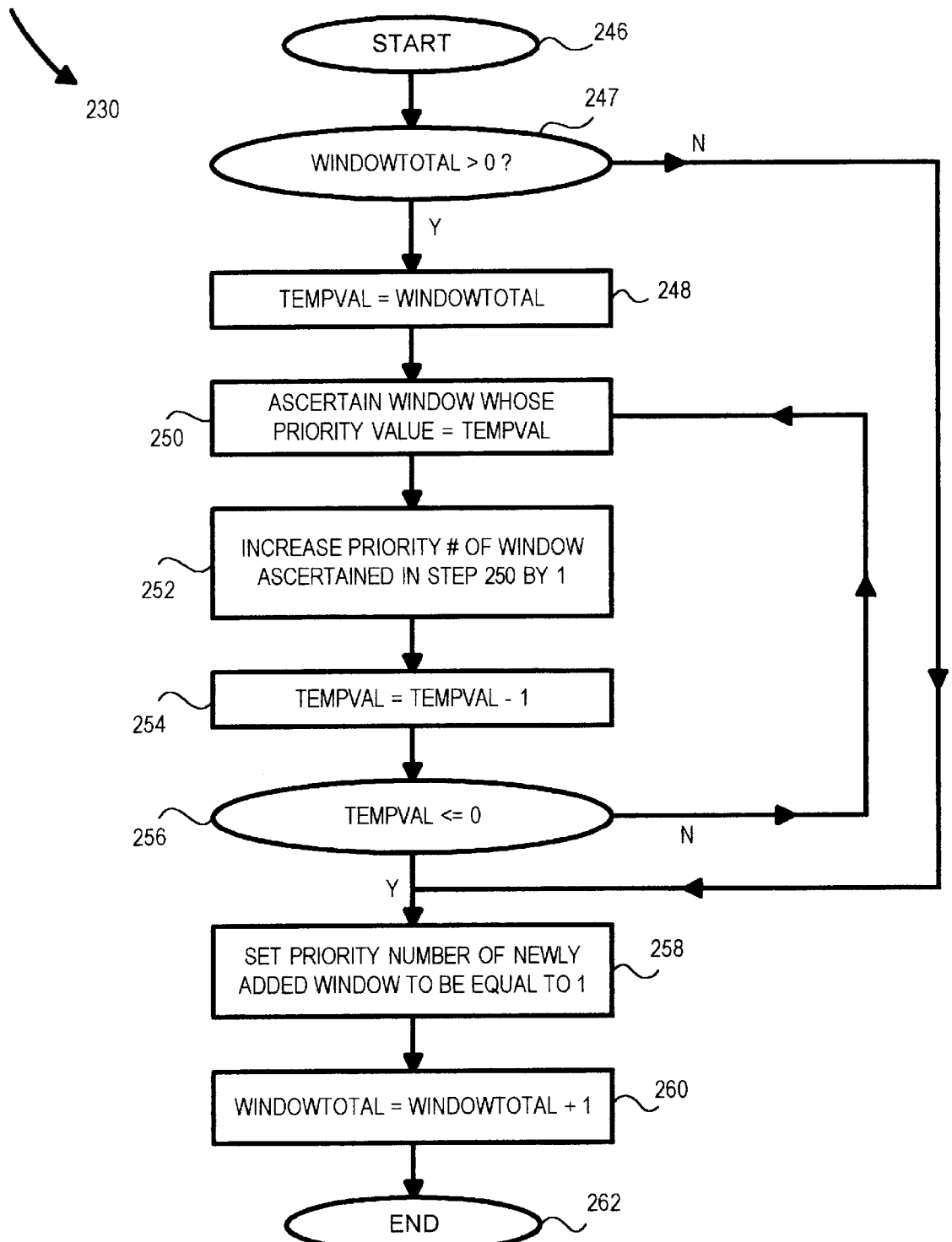
FIG. 5B shows in a simplified flowchart format step 230 of FIG. 5A, representing the addition of a window and the recalculation of the priority number of all windows.

FIG. 5B shows in a simplified flowchart format step 230 of FIG. 5A, representing the addition of a window and the recalculation of the priority number of all windows. In the method illustrated in FIG. 5B, all existing windows have their priority numbers incremented by 1, and the newly added window is assigned the priority number 1. FIG. 5B starts at step 246. From step 246, the method proceeds to step 247 to check whether there exists any window in the workspace prior to the addition of a new window, e.g. by checking whether global variable WindowTotal is greater than zero. If there is no window currently existing in the workspace (WindowTotal not greater than zero in step 247), the method proceeds to step 258 to set the priority number of the newly added window to 1. From step 258, the method proceeds to step 260 to increment the global variable WindowTotal by 1. From step 260, the method proceeds to step 262 where the steps of FIG. 5B end.

On the other hand, if there is at least one window currently existing in the workspace (WindowTotal is greater than zero in step 247), the method proceeds to step 248 to set a temporary variable TempVal to be equal to the total number of windows existing prior to the addition of a new window (WindowTotal). From step 248, the method proceeds to step 250 to ascertain the window whose priority number equals TempVal. During the first iteration, the window ascertained in step 250 has a priority number equal to WindowTotal since TempVal equals WindowTotal in step 248.

From step 250, the method proceeds to step 252 to increase the priority number of the window ascertained in step 250 by 1. From step 252, the method proceeds to step 254 to decrement the temporary variable TempVal by 1. From step 254, the method proceeds to step 256 where it checks whether TempVal is less than or equal to zero. If TempVal is greater than zero (as determined in step 256), the method returns to step 250 to ascertain the next window whose priority number is now TempVal and proceeds to step 252 to increment the priority number of that window. In this manner, all existing windows have their priority number incremented by 1 until it is determined in step 256 that no window remains to be incremented. If it is determined in step 256 that TempVal is less than or equal to zero, the method proceeds to step 258 to set the priority number of the newly added window to 1 as mentioned earlier. From step 258, the method proceeds to step 260 to increment the global variable WindowTotal by 1. From step 260, the method proceeds to step 262 where the steps of FIG. 5B end.

Figure 5C:
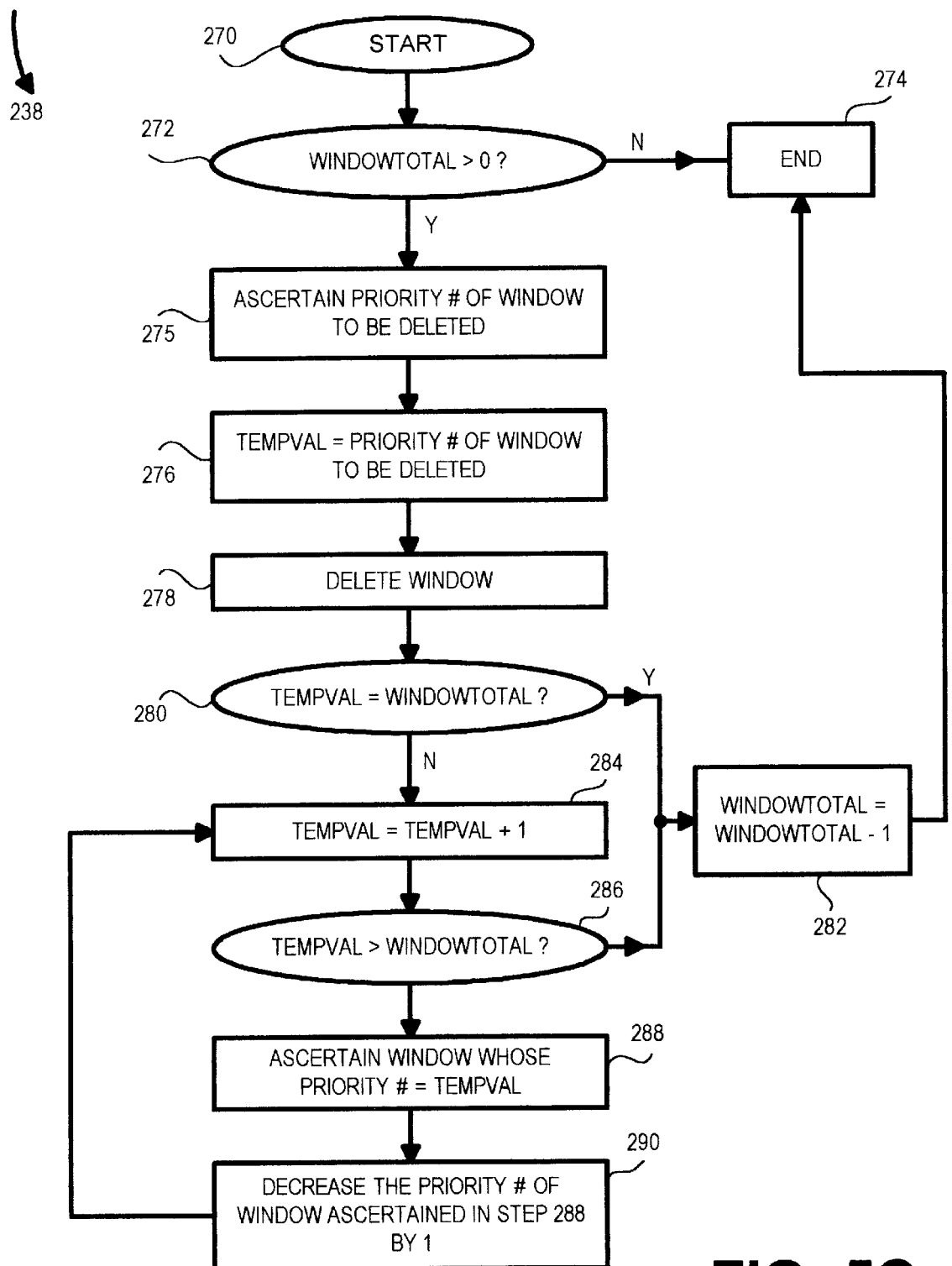
FIG. 5C shows in a simplified flowchart format step 238 of FIG. 5A, representing the delete a window and recalculate the priority number of remaining windows step.

FIG. 5C shows in a simplified flowchart format step 238 of FIG. 5A, representing the delete a window and recalculate the priority number of affected windows step. In the method illustrated by FIG. 5C, the method deletes a window chosen for deletion and increments the priority number of all windows which were lower in priority, i.e. having a greater priority number, than the window deleted. FIG. 5C starts at step 270. From step 270, the method proceeds to step 272 to check whether the total number of windows currently displayed in the workspace is greater than zero by checking whether the global variable WindowTotal is greater than zero. If WindowTotal is less than or equal to zero (as determined in step 272), the method proceeds to step 274 where the steps of FIG. 5C end. On the other hand, if the total number of windows currently displayable is greater than zero (as determined in step 272), the method proceeds to step 275 to ascertain the priority number of the window chosen to be deleted.

From step 275, the method proceeds to step 276 to set the temporary variable TempVal equal to the priority number of the window chosen to be deleted, whose priority number is ascertained in step 275. From step 276, the method proceeds to step 278 to delete the window chosen for deletion by removing it from the display screen. From step 278, the method proceeds to step 278 to check whether the temporary variable TempVal is equal to the total number of windows displayed before deletion. If TempVal equals WindowTotal during this first iteration (as determined in step 280 during the first iteration), the method proceeds to step 282 to decrement the global variable representing the total number of windows in the workspace, WindowTotal, by 1. From step 282, the method proceeds to step 274, representing the end of the steps of FIG. 5C.

On the other hand, if the temporary variable TempVal is not equal (as determined in step 280) to the total number of windows in the workspace, which is represented by the global variable WindowTotal, the method proceeds to step 284 to increment the temporary variable TempVal by 1. From step 284, the method proceeds to step 286 where it checks whether the temporary variable TempVal is greater than the global variable WindowTotal. If TempVal is greater than WindowTotal (as determined in step 286), the method proceeds to step 282 to decrement by 1 the global variable WindowTotal and to step 274 to end the steps of FIG. 5C.

On the other hand, if the temporary variable TempVal is less than or equal to the global variable WindowTotal (as determined in step 286), the method proceeds to step 288 to ascertain the window whose priority number equals the temporary variable TempVal. From step 288, the method proceeds to step 290 to decrease the priority number of the window ascertained in step 288 by 1. Thereafter, the method returns to step 284 to increment the temporary variable TempVal by 1, and to continue incrementing the priority number of all remaining windows whose priority number is lower (therefore greater in numerical value) than the window deleted in step 278.

Figure 5D:
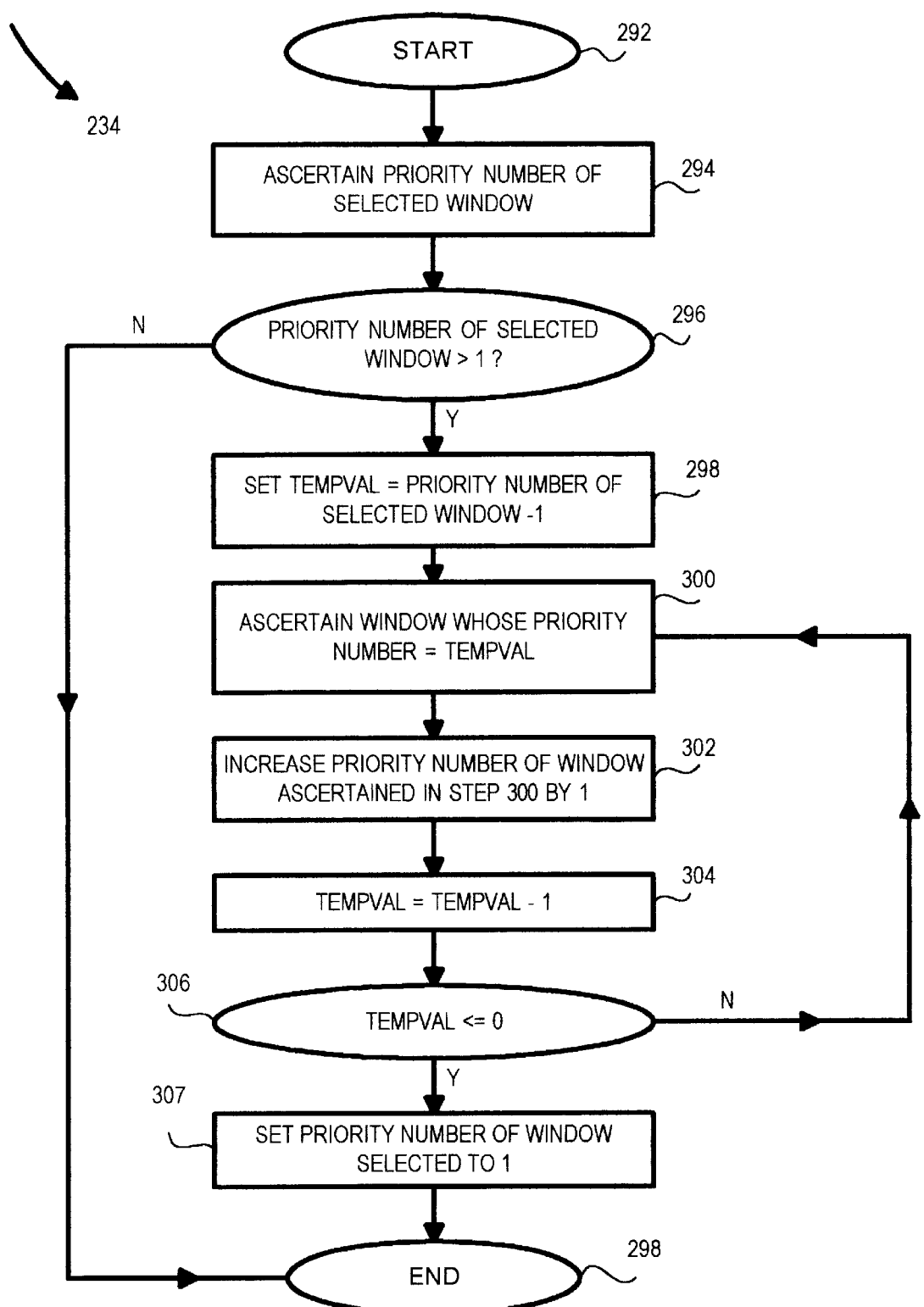
FIG. 5D shows in a simplified format the select background window and recalculate priority number step 234 of FIG. 5A.

FIG. 5D shows in a simplified format the select background window and recalculate priority numbers of affected windows step 234 of FIG. 5A. In the steps of FIG. 5D, the priority number of all windows whose priorities are higher, i.e. having a smaller priority number, than the window selected to be displayed in visual foreground are lowered in priority, i.e. have their priority number incremented by 1. The method then assigns the value 1 to the priority number of the window selected to be displayed in the visual foreground. FIG. 5D starts at step 292. From step 292, the method proceeds to step 294 to ascertain the priority number of the selected window. From step 294, the method proceeds to step 296 to check whether the priority number of the selected window, whose priority number is ascertained in step 294, is greater than 1. If the priority number of the selected window is not greater than 1 (as determined in step 296) that window selected has a priority number of 1 because a window must have a priority number equal to or greater than 1. In this case, no reshuffling of windows is needed and the method proceeds to step 298 where the steps of FIG. 5D end.

On the other hand, if the priority number of the selected window is greater than 1 (as determined in step 296), the method proceeds to step 298 to set a temporary variable TempVal equal to the priority number of the selected window less 1. From step 298, the method proceeds to step 300 to ascertain the window whose priority number equals the temporary variable TempVal. From step 300, the method proceeds to step 302 to increase the priority number of the window ascertained in step 300 by 1. From step 302, the method proceeds to step 304 to decrement the value of the temporary variable TempVal by 1. From step 304, the method proceeds to step 306 where it checks whether the temporary variable TempVal is less than or equal to zero. If the temporary variable TempVal is less than or equal to zero (as determined in step 306), the method proceeds to step 307 to set the priority number of the window selected to 1. From step 307, the method proceeds to step 298, representing the end of the steps of FIG. 5D.

On the other hand, if the temporary variable TempVal is greater than zero (as determined in step 306) the method returns to step 300 to continue incrementing the priority number of the windows whose priority numbers are lower than the window selected.

Figure 6A:
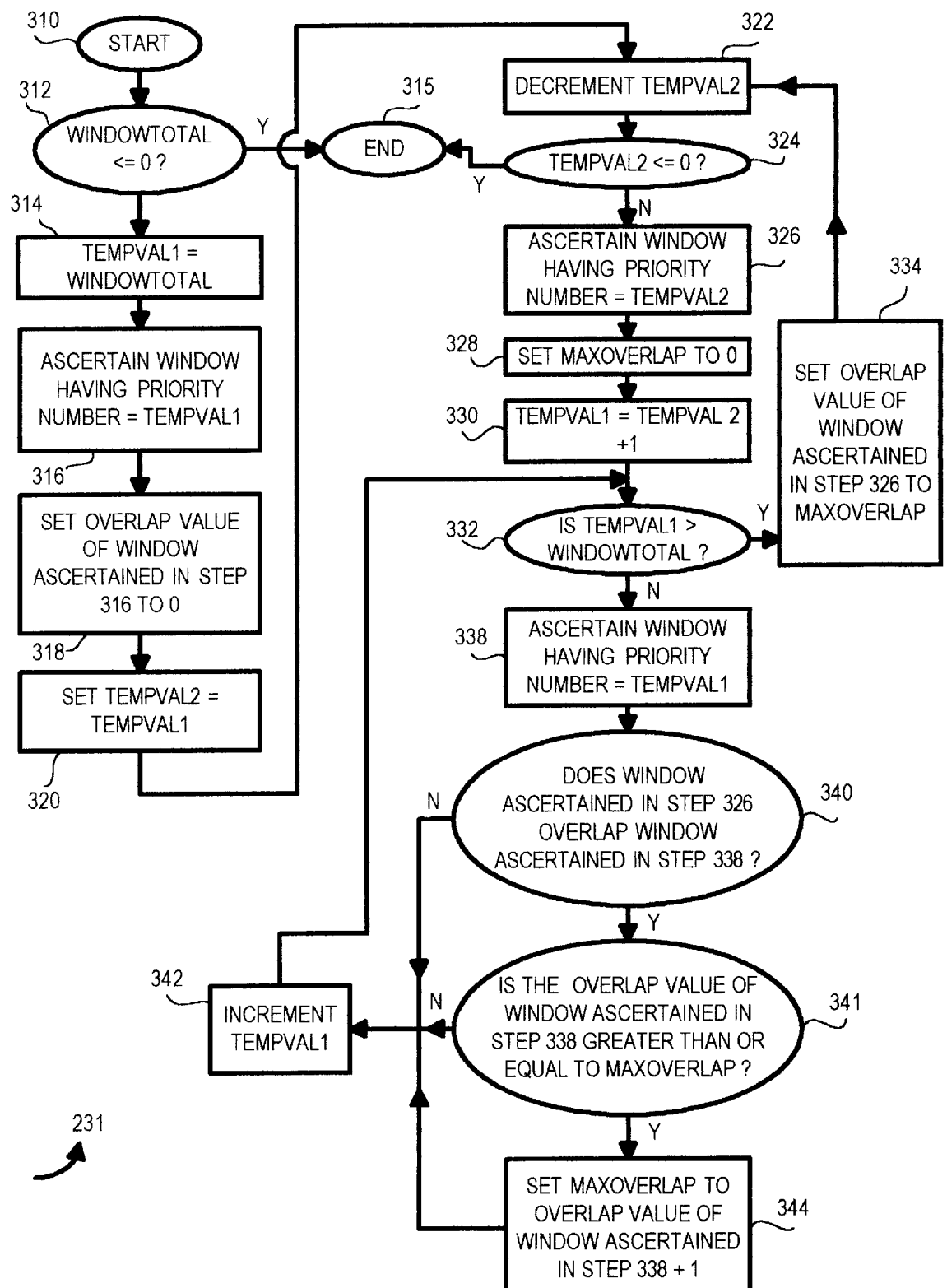
FIG. 6A shows in a simplified flowchart format step 231 of FIG. 5A, representing the recalculate overlap values step.

FIG. 6A shows in a simplified flowchart format step 231 of FIG. 5A, representing the recalculate overlap values step. In FIG. 6A, the window having the lowest priority, i.e. its priority number has the greatest numerical value, is considered positioned in the visual background and does not overlap any other windows in the workspace. Thereafter, the method checks every window that has a higher priority then the window displayed to see whether the window displayed is overlapped by any window which has a higher priority than it. For every lower priority window overlapped by a higher priority window, the higher priority window has its overlap value incremented by 1. In other words, all windows are assumed to have an overlap value of zero unless it is found to overlap one or more lower priority windows.

To accomplish the above mentioned overlap value calculation task for each window in a workspace, the method preferably utilizes three temporary variables, MaxOverlap, TempVal2 and TempVal1. MaxOverlap is used to keep track of the overlap value of a given window as it is checked against windows having lower priority. As each window, starting from the window having the lowest priority, is checked to see whether it overlaps any other window having a lower priority than itself, TempVal2 is used to keep track of the window being checked. TempVal1, on the other hand, is used to check among the windows having lower priorities than the window tracked by TempVal2 to determine whether the window tracked by TempVal2 does indeed overlap any lower priority window, down to the window having the lowest priority.

FIG. 6A starts at step 310. From step 310 the method proceeds to step 312 to check whether there is any window displayed in the workspace. In step 312, the global variable WindowTotal is tested against the value zero. If WindowTotal is less than or equals zero (as determined in step 312) the method proceeds to step 315 where the steps of FIG. 6A end.

On the other hand, if the total variable WindowTotal is greater than zero (as determined in step 312), the method proceeds to step 314 where the temporary variable TempVal1 is set to be equal to the global variable WindowTotal. From step 314, the method proceeds to step 316 to ascertain the window whose priority number equals the temporary variable TempVal1. From step 316, the method proceeds to step 318 to set the overlap value of the window ascertained in step 316 to zero. As is apparent, the window having the lowest priority (whose priority number equals WindowTotal) has an overlap value equals to zero.

From step 318, the method proceeds to step 320 to set the temporary variable TempVal 2 equal the temporary variable TempVal1. From step 320, the method proceeds to step 322 to decrement the temporary variable TempVal2 by 1. From step 322, the method proceeds to step 324 to check whether the temporary variable TempVal2 is less than or equal to zero. If the temporary variable TempVal2 is less than or equal to zero (as determined in steps 324), the method returns to step 315 to end the steps of FIG. 6A.

On the other hand, if the temporary variable TempVal2 is greater than to zero (as determined in steps 324), the method proceeds to step 326 to ascertain the window whose priority number equals the temporary variable TempVal2. From step 326, the method proceeds to step 328 to set the temporary variable MaxOverlap to zero. From step 328, the method proceed to step 330 to set the temporary variable TempVal1 equal a value representing the sum of the temporary variable TempVal2 plus 1. In this manner, TempVal1 is used to check among the windows having lower priorities than the window whose priority number equals TempVal2, starting from the window whose priority is immediately below the window whose priority number equals TempVal2, to see whether any of them are overlapped by the window whose priority number equals TempVal2.

From step 330, the method proceeds to step 332 to check whether the temporary variable TempVal1 is greater than the global variable WindowTotal. If the temporary variable TempVal1 is greater than the global variable WindowTotal (as determined in step 332), all windows having lower priorities than the window represented by TempVal2 have been checked for overlap, and the method proceeds to step 334 to set the overlap value of the window ascertained in step 326 to temporary variable MaxOverlap. From step 334, the method proceeds to step 322 to decrement TempVal2 and begin checking the next higher priority window.

On the other hand, if the temporary variable TempVal1 is less than or equal the global variable WindowTotal (as determined in step 332), there is still at least one more window having a lower priority than the window represented by TempVal2 that needs checking whether it is overlapped by the window represented by TempVal2. In this case, the method proceeds to step 338 to ascertain the window whose priority number equals to the temporary variable TempVal1. From step 338, the method proceeds to step 340 to check whether the window ascertained in step 326, i.e. the window having a priority number equal TempVal2, overlaps with the window ascertained in step 338. If the window ascertained in step 326 does not overlap the window ascertained in step 338 (as determined in step 340), the method proceeds to step 342 to increment the temporary variable TempVal1 by 1 and then to step 332 to again check whether the temporary variable TempVal1 is greater than the global variable WindowTotal.

On the other hand, if the window ascertained in step 326 overlaps the window ascertained in step 338 (as determined in step 340), the method proceeds to step 341 to check whether the overlap value of the window ascertained in step 338 is greater or equal to the temporary variable MaxOverlap. In other words, the method checks in step 341 if the overlapped window has an overlap value that is higher than the current overlap value stored in variable MaxOverlap. If the overlap value of the window ascertained in step 338 is not greater or equal to the temporary variable MaxOverlap (as determined in step 341), the method proceeds to step 342 to increment the temporary variable TempVal1 by 1 and then to step 332 to again check whether the temporary variable TempVal1 is greater than the global variable WindowTotal. On the other hand, if the overlap value of the window ascertained in step 338 is greater or equal to the temporary variable MaxOverlap (as determined in step 341), i.e. the window being overlapped has a higher overlap value than the overlap value currently stored in temporary variable MaxOverlap, the method proceeds to step 344 where the temporary variable MaxOverlap is set to be the overlap value of the window ascertained in step 338 plus 1. From step 344, the method proceeds to step 342 to increment the temporary variable TempVal1 by 1 and then to step 332 to again check whether the temporary variable TempVal1 is greater than the global variable WindowTotal. In this manner, the method checks, for a given window, all windows having a lower priority than that given window to ascertain the window having highest overlap value. The overlap value of the given window is then set to be the highest overlap value found among windows having lower priorities plus one.

Figure 6B:
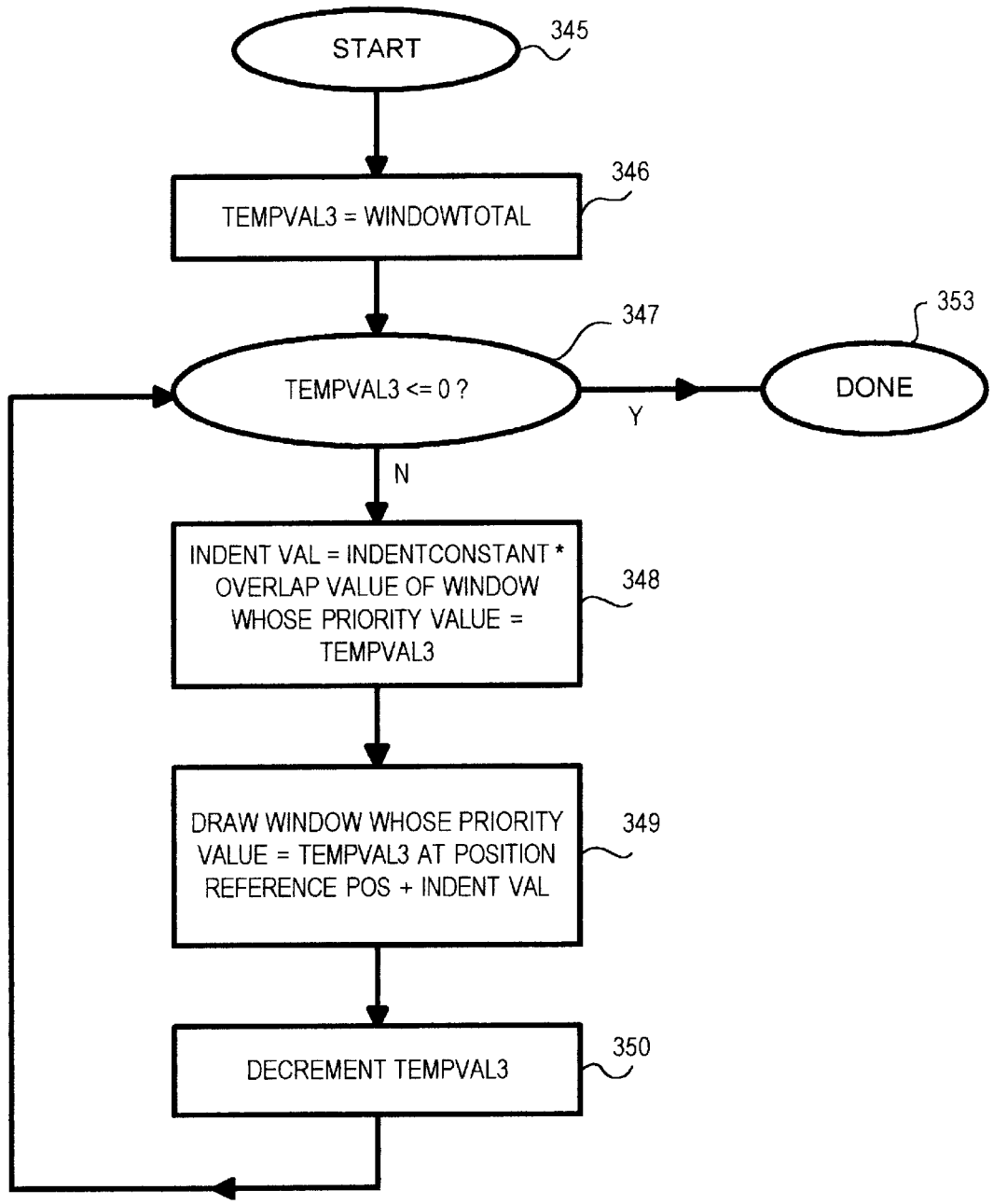
FIG. 6B shows in simplified flowchart format step 226 of FIG. 5A, representing the display windows step.

FIG. 6B shows in simplified flowchart format step 226 of FIG. 5A, representing the display windows step. In the steps of FIG. 6B, the method displays each window, starting from the window having the lowest priority, according to the unique inventive method. The window having the lowest priority is by default positioned at a predefined reference position. The reference position may be predefined by the user or by the software. The steps of FIG. 6B starts at step 345. From step 345, the method proceeds to step 346 to set a temporary variable TempVal3 equal the number representing the total number of windows in the workspace (WindowTotal). From step 346, the method proceeds to step 347 to check whether the temporary variable TempVal3 is less than or equal to zero. If the temporary variable TempVal3 is less than or equal to zero (as determined in step 347), all windows (or none if this is the first iteration) have been displayed, and the method proceeds to step 353 where the steps of FIG. 6B end. On the other hand, if the temporary variable TempVal3 is greater than zero (as determined in step 347), there are still windows to be displayed in the workspace, and the method proceeds to step 348 to calculate the indentation value (IndentVal) for the window whose priority number equals the temporary variable TempVal3.

In step 348, the variable IndentVal, representing the indentation value, is set to be equal to an indentation constant, representing a value predefined either by the user or by the software program, multiplied by the overlap value of the window whose priority number equals the temporary variable TempVal3. From step 348, the method proceeds to step 349 to draw the window whose priority number equals the temporary variable TempVal3 at its appropriate position. In step 349, the method draws the window at a position representing the reference position plus the indentation value calculated in step 348. In some implementations, e.g. Apple Macintosh Computers, the drawing process may be optimized to draw only the portion of the screen that needs redrawing, thereby improving the speed at which the screen is redrawn. From step 349, the method proceeds to step 350 where the temporary variable TempVal3 is decremented by 1. From step 350, the method loops back to step 347 to draw the next higher priority window if there is one. As is apparent from the foregoing, because each window that overlaps another is indented from the position occupied by the window it overlaps, no window is completely overlapped and obscured. Consequently, at least a portion of every window is always visually perceptible to the user, ready for selection.

Figure 7:
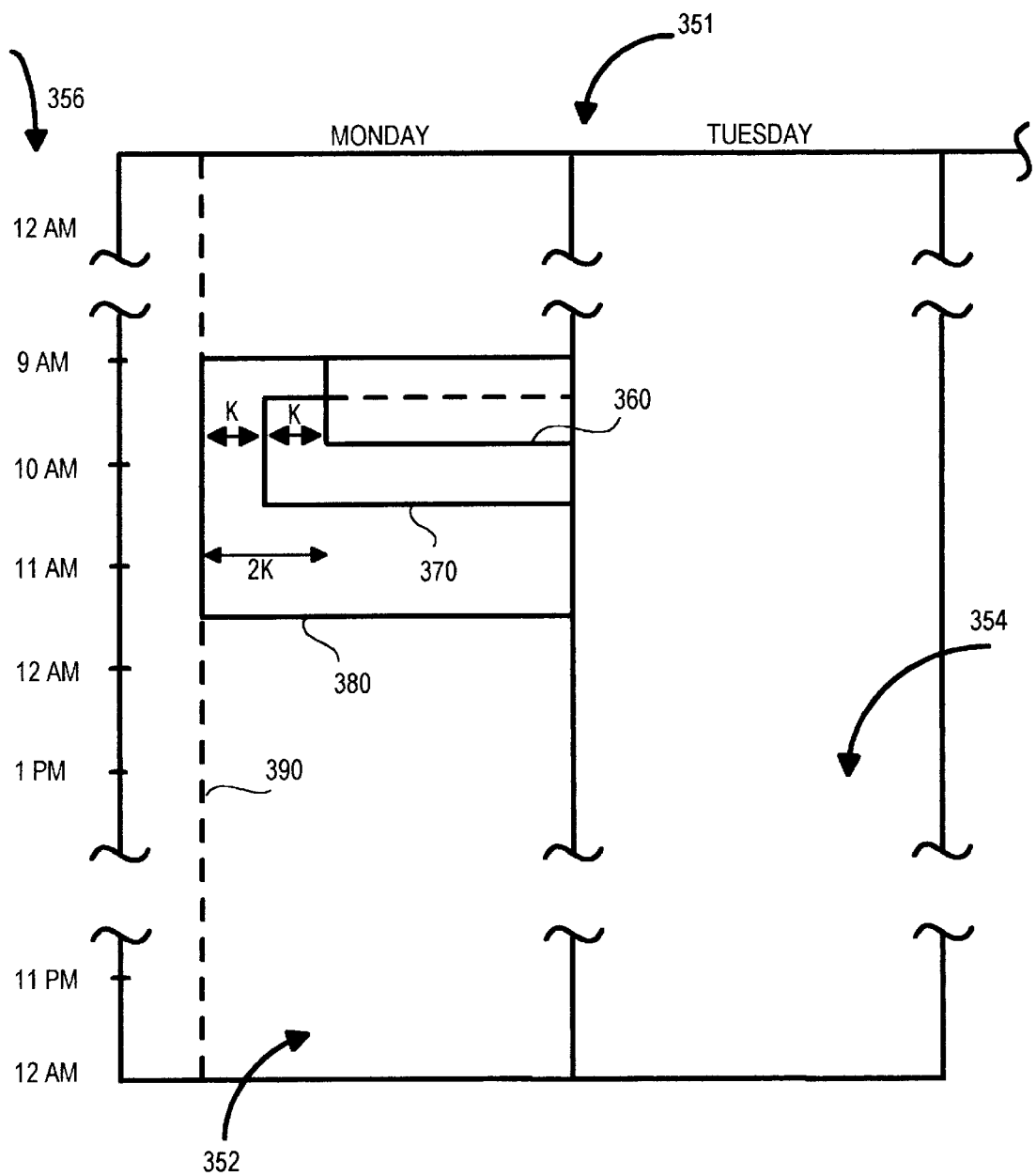
FIG. 7 shows, for illustration purposes, an application program that utilizes multiple overlapping windows.

For illustration purposes, an application program, such as Claris Organizer™ version 1.0 produced by Claris, Inc. of Santa Clara, Calif., is shown in FIG. 7. Claris Organizer™ is a personal information management program and contains different modules for performing different functions. A portion 351 of an appointment calendar module, showing a user's appointment for each hour of each day of the week, is illustrated in FIG. 7. For ease of illustration, only two days, Monday and Tuesday, are shown in portion 351. Monday is represented graphically by column 352, and Tuesday is represented graphically by column 354. A vertical time line 356 shows the time of the day, and a plurality of windows 360, 370, and 380 shows the appointment blocks that have been set by the user. In the example given in FIG. 7, three overlapping appointments have been set for Monday. Window 360 represents an appointment which lasts from 9:00 to 10:00; window 370 represents an appointment which lasts from 9:30 to 10:30; and window 380 represents an appointment which lasts from 9:00 to 11:30. Because these are appointments for Monday, windows 360, 370, and 380 are logically confined to column 352 and have as their workspace the space within column 352. It should be noted however, as mentioned earlier, the workspace may be defined for any portion of a computer display screen, including the entire display screen itself as appropriate.

As discussed, each of windows 360, 370, and 380 is given a unique priority number. The priority number of each window may be assigned in sequence as each window is created with the stipulation that the most recently selected or created window would be given a priority number of 1. Alternatively, the user may set a preference for each window without regard for the time it is created or selected, e.g. specifying that a specific window should be in the visual foreground and therefore has a priority number of 1. In the example of FIG. 6A, window 360 represents the window most recently created and therefore has a window priority number of 1. Assuming that window 370 is created after the creation of window 380, window 370 has a priority number of 2, and window 380 has a priority number of 3.

The overlap value of each window, as discussed in FIG. 6A, is determined starting from the window having the lowest priority. Window 380 has the lowest priority, and its overlap value is therefore zero. Because window 370 overlaps a lower priority window, window 380, its overlap value is 1. Window 360 overlaps windows 370 and 380. Since window 370 is the window that 1) has a lower priority than window 360, 2) being overlapped by window 360, and 3) has the highest overlap value (i.e. 1) among windows 370 and 380, the overlap value of window 360 equals the overlap value of window 370+1 (see FIG. 6A and the associated text for further explanation), or two.

Figure 8:
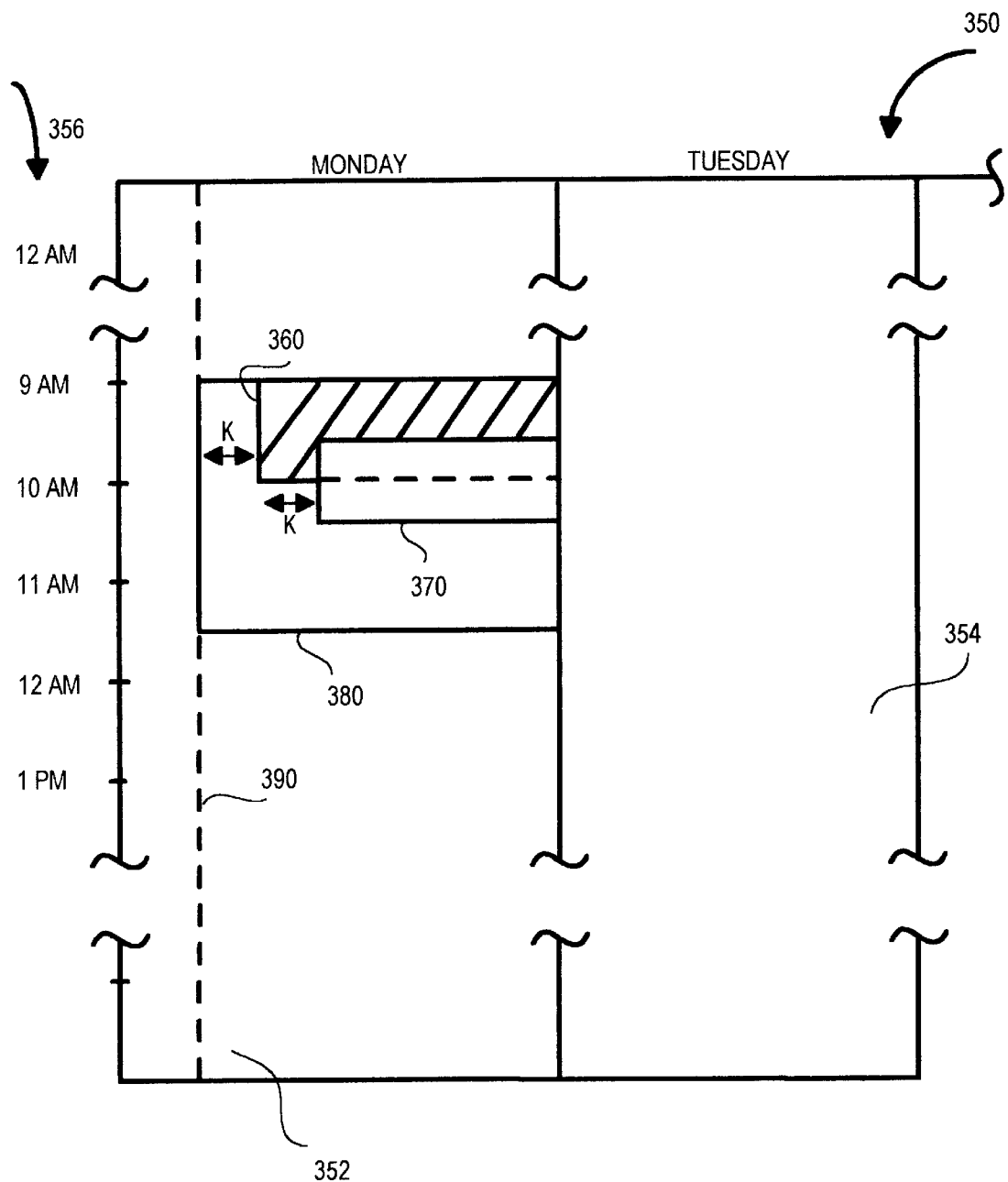
FIG. 8 shows the multiple windows of FIG. 7 after a background window is brought forward into the visual foreground.

Regardless of the window selected, the present invention advantageously keeps each window visually available, at least partially if not completely, in the workspace via indentation. For ease of illustration, the indentation in the example of FIGS. 7 and 8 is performed only in the +x axis away from a predefined vertical reference line 390 although indentation in another direction, or more than one direction, is possible. In the diagram of FIG. 7, window 370 overlaps window 380 and has an overlap value of 1. In this case, window 370 is indented from reference line 390 by a predetermined indentation value K (IndentVal) times the overlap value of window 370, or K*1, or K.

Window 360, which partially overlaps window 370 and window 380, has an overlap value of 2. Consequently, it is indented from the reference line 390 by a predetermined indentation value K (IndentVal) times the overlap value of window 360, or K*2, or 2K. As is apparent, each window occupies a unique position in the workspace because a window may a) be located at the reference position and not overlapping another window, or b) overlap another window and is indented by IndentVal from the first lower priority window it overlaps. The locations of windows 360, 370, and 380 are as shown in FIG. 7. It should be noted that as the windows are displayed, they are confined generally within the workspace assigned to them, or column 352 in this case.

To illustrate further, FIG. 8 shows the diagram of FIG. 7 after window 370 has been selected. As expected, window 370 is brought to the visual foreground. Further, the priority numbers of the windows in the workspace are updated.

Figure 9:
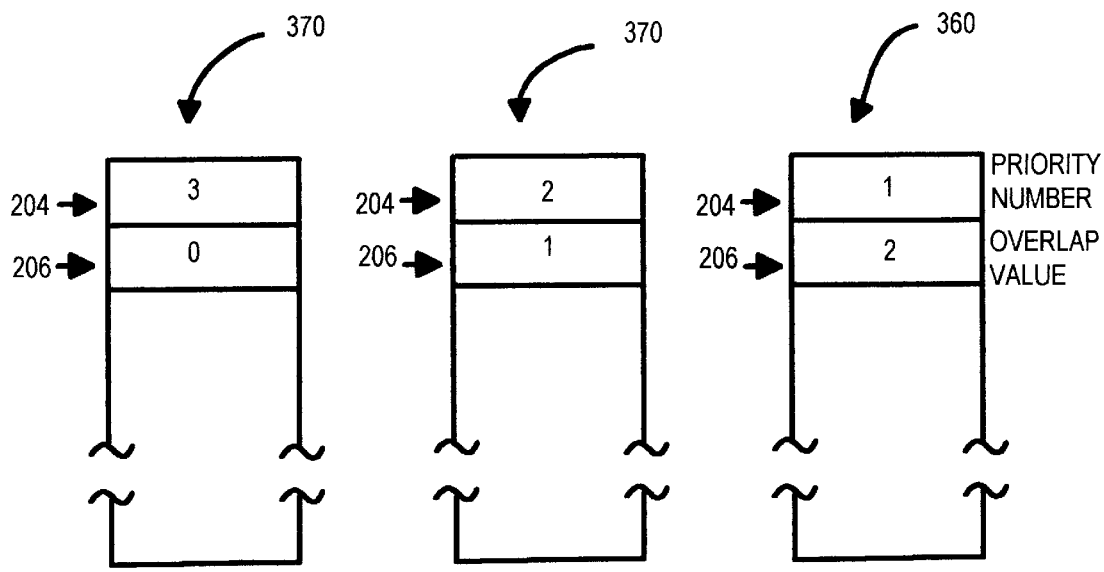
FIG. 9 shows in a simplified format the priority numbers and the overlap values of the windows in FIG. 7.
Figure 10:
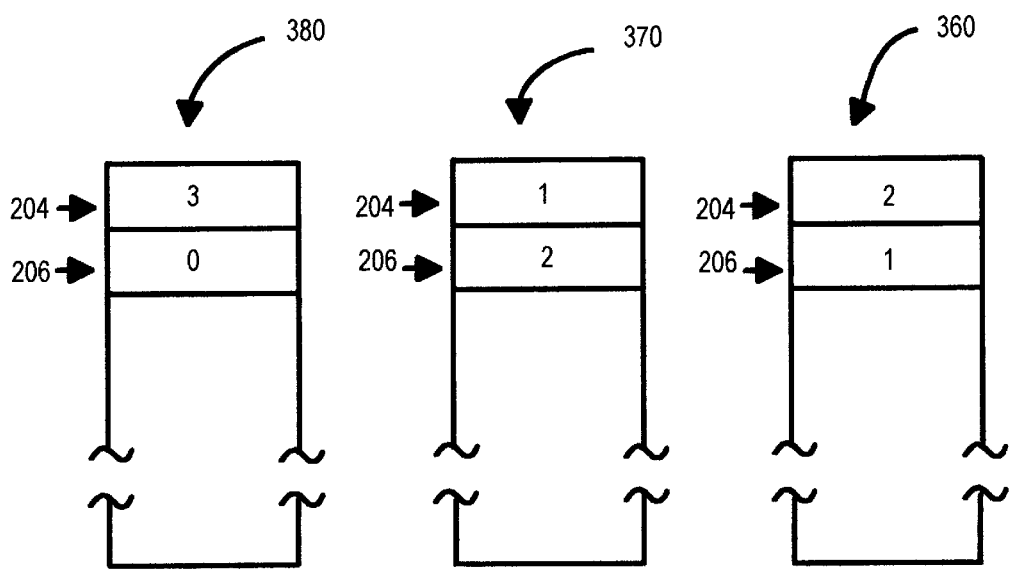
FIG. 10 shows in a simplified format the priority numbers and the overlap values of the windows in FIG. 8.

To help the reader visualize the update in priority number and overlap value, FIGS. 9 and 10 are furnished. FIG. 9 shows in a simplified format the priority numbers and the overlap values of windows 360, 370, and 380 as they are presented in FIG. 7. FIG. 10 shows in a simplified format the priority numbers and the overlap values of windows 360, 370, and 380 as they are presented in FIG. 8, after window 370 is selected and brought to the visual foreground. Referring to FIG. 9, windows 360, 370, and 380 have priority numbers 1, 2, and 3 respectively as mentioned earlier in connection with FIG. 7. Further, windows 360, 370, and 380 have overlap values 2, 1, and 0 respectively as discussed in connection with FIG. 7.

After window 370 is selected and brought to the visual foreground, window 370 has a priority number of 1 as expected. As discussed in connection with FIG. 6A, all windows having a higher priority (lower priority number) than the priority of the window selected have their priority numbers incremented by 1. Because window 360 has higher priority than window 360 prior to selection, window 360 has its priority number incremented by 1, from 1 to 2. The priority number of window 380 is unchanged because window 380 has a lower priority than the selected window 370. The recalculated priority numbers of windows 360, 370, and 380 after window 370 is selected are shown in FIG. 10.

In accordance to FIG. 6A, the overlap values of windows 360, 370, and 380 are then calculated. Window 380, being the window with the lowest priority, is assigned an overlap value of zero. Window 360, now the window with the next higher priority from window 380, is next checked for overlap. If window 360 overlaps on the display screen with window 380, its overlap value is set to be the overlap value of window 380+1. In the example of FIG. 8, window 360 does indeed overlap window 380 and therefore has a computed overlap value 0+1 or 1. Window 370, now having the next higher priority, is next examined for overlap. Window 370 is checked against windows that 1) have a lower priority than itself, 2) being overlapped by itself to ascertain among them the window having the highest overlap value. Since window 360 now has the highest overlap value among the set of windows checked, the overlap value of window 370 equals the overlap value of window 360+1 (see FIG. 6A and the associated text for further explanation), or two.

FIG. 8 shows windows 360, 370, and 380 after window 370 is selected and brought to the visual foreground. As expected, window 380, having the lowest priority, is drawn at reference position 390. Window 360, having an overlap value of 1, is drawn at reference position 390+(K*1), where K is a predefined value. Window 370, having the highest priority and an overlap value of 2, is drawn at reference position 390+(K*2). As shown, window 370 is now in the visual foreground, unobstructed by any other windows. Further, windows 360 and 380 are displayed such that at least a portion of those windows are visible and readily available for selection.

As is apparent from the foregoing, the manner in which the windows are arranged in accordance to the disclosed inventive method also advantageously conveys the windows' priority information to the user. A window's location in the workspace relative to other windows it overlaps and to the reference position suggests its priority to the user in a format that is quick and easy to understand. In the specific example, the user can determined at a glance, based upon the manner windows 360, 370, and 380 are indented in FIG. 7, that window 360 has a higher priority than window 370, which in turn has a higher priority than window 380.

In the specific embodiment, the windows are preferably resized upon indentation if necessary to fit inside the workspace. In FIG. 8, the post-indentation diagram of window 360 of FIG. 7 expands to fill the width of workspace 352 from the position where it is indented. Similarly, window 370 of FIG. 7 shrinks in width to fit in workspace 352 as it is indented from position reference+K to position reference+2K. During resizing, the area inside each window is preferably but not necessarily maintained constant. Resizing maximizes space utilization within the workspace. In one embodiment, the user further has the option of defining the minimum width to which a window may be shrunk. If the window needs to be shrunk beyond its minimum width, due to indentation, a visible or audible warning may optionally be posted to a user, or the method simply does not shrink that minimum width window further.

Figure 1:
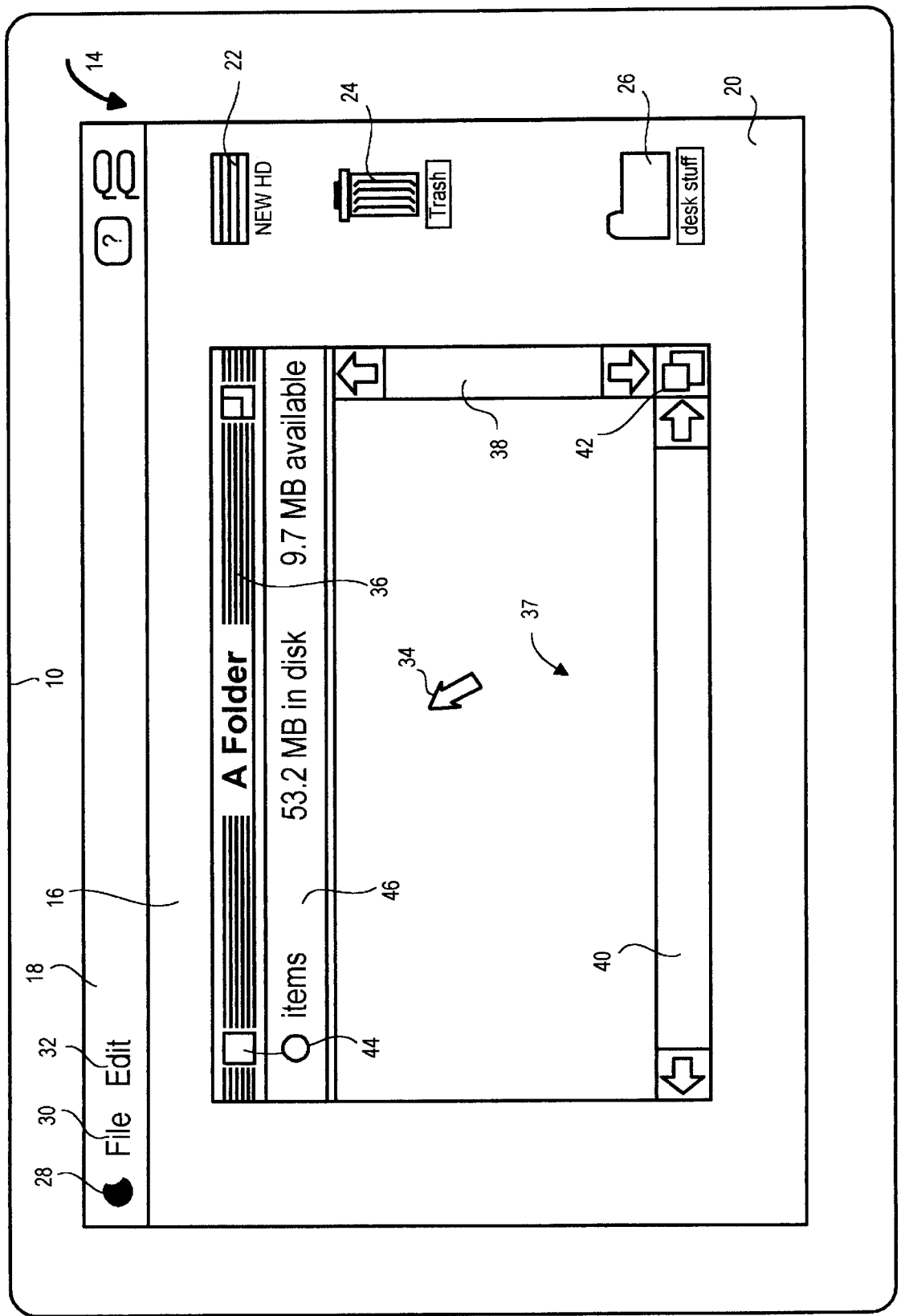
FIG. 1 shows a typical prior art GUI screen on a computer display screen.
Figure 11:
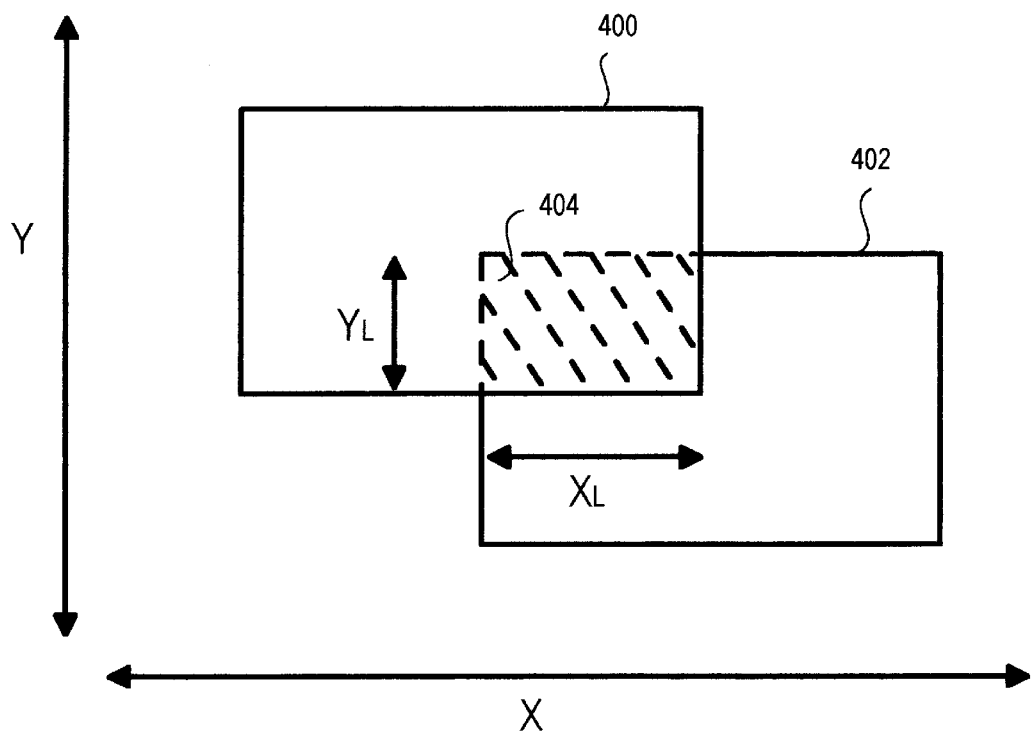
FIG. 11 shows two overlapping windows for the purpose of discussing the logical overlap concept.

It is contemplated that the user can specify parameters for determining when two or more windows logically overlap, thereby trigging indentation of windows. Referring to FIG. 11, two windows 400 and 402 are shown. For illustration purposes, window 400 is the selected foreground window, and window 402 is set to the visual background. Although not visible to the user, there exists an overlap area, represented by shaded area 404 within which portions of window 402 cannot be seen by the user. To clarify, a physical overlap occurs between two areas when they share a common x and y coordinate. Physical overlap between two areas also occurs when one of the areas is partially obstructed from view by another area. In one embodiment, a logical overlap is deemed to have occurred when two or more windows physically overlap, i.e., share a common x and y coordinate. In FIG. 11, windows 400 and 402 share common y coordinates shown by the arrow labeled YL and common x coordinates shown by the arrow labeled XL. Using these parameters, windows 400 and 402 of FIG. 1 are deemed logically overlapping.

In another embodiment, a user can specify that two windows are logically overlapped only when there are both: 1) a physical overlap between the windows; and 2) the size of the overlapped area, such as area 404 in FIG. 11, meets or exceeds a certain percentage of the size of one or both windows under consideration. In FIG. 11, for example, the user can specify that for the purpose of defining a logical overlap, a logical overlap is deemed to have occurred only when a certain percentage, say 40%, of overlapped window 402 is physically overlapped, i.e. obstructed from view.

Figure 12:
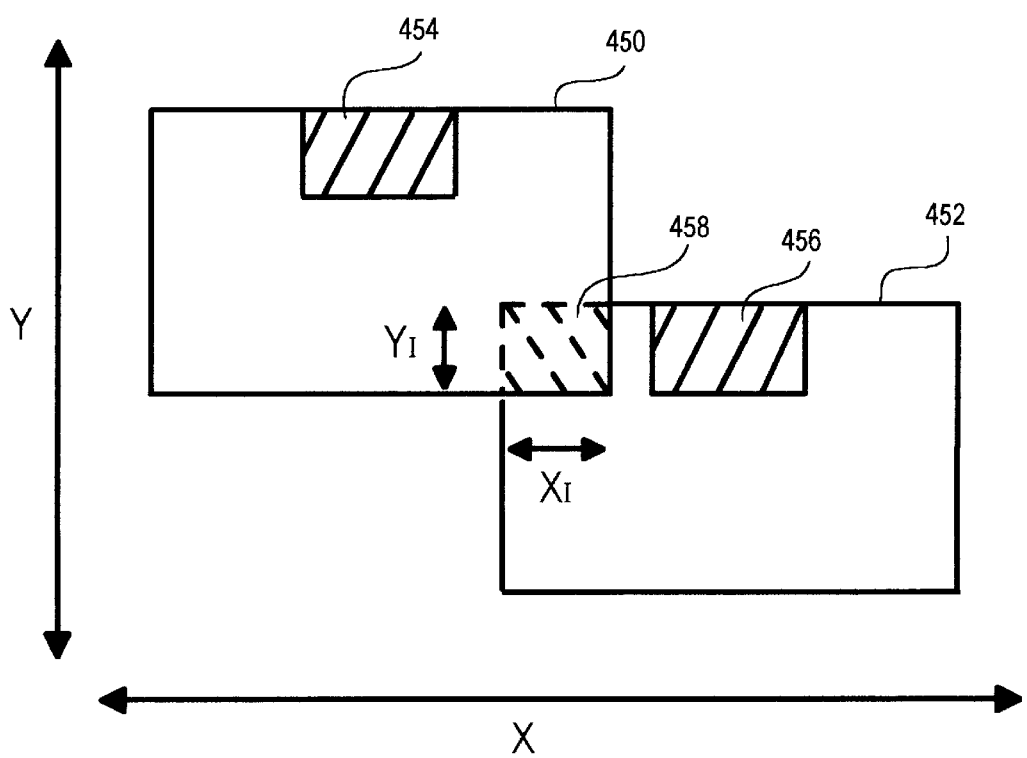
FIG. 12 shows two overlapping windows, each of which has a critical area, for the purpose of discussing the logical overlap concept.

In yet another embodiment, a logical overlap is deemed to have occurred only when certain critical areas of a window is physically overlapped, i.e. obstructed from view. Referring to FIG. 12, there are shown two windows 450 and 452. Each window may have a predefined "critical area" which the user does not want to be obstructed from view. For example, window 450 has a critical area 454, and window 452 has a critical area 456 respectively. Further, suppose the two windows physically overlaps at an overlap area 458. Although windows 450 and 452 physically overlaps and share common x coordinates XI and common y coordinates YI as shown in FIG. 12, neither of critical areas 454 and 456 is obstructed from view. Consequently, a logical overlap is not deemed to have occurred according this embodiment.

In a further embodiment, a user can specify that for the purpose of defining a logical overlap, no logical overlap is deemed to have occurred unless a certain percentage of the critical area of the overlapped window is obscured from view. It is also contemplated that for the purpose of determining when a logical overlap occurs between two windows, a user can specify for each individual window the critical area which cannot be partially or wholly obstructed from view. The implementation of the above-mentioned embodiments are readily apparent to those of ordinary skills in the computing art given this disclosure.

Although the foregoing invention has been described in some detail for purposes of clarity of understanding, it will be apparent that certain changes and modifications may be practiced within the scope of the appended claims. For instance, although the specification has been described in detail different methods for performing updates of the priority numbers, the overlap values, and for displaying windows in sequential steps, these steps do not, in some instances, have to follow the exact sequence described and may be modified to achieve substantially the same result by one skilled in the art without departing from the scope and spirit of the present invention.

Further, although the invention is described using flowcharts as an illustration aid, it should be noted that the methods and apparatus of the present invention may be event-driven, capable of executing multiple processes at the same time. As such, different processes and tasks do not necessarily have to be performed in the specific sequential order chosen for illustration, and a computer and/or software program implementing the inventive method may be executing other tasks while executing the inventive method disclosed herein.

As a further example, although the updates of priority numbers and overlap values are performed using two temporary counter variables, other methods of updating the priority numbers and overlap values may be used. In the same manner, the window having the highest priority may be assigned the greatest priority number instead of priority number 1, and the window having the lowest priority may be assigned a low priority number, e.g. 1 or 0, instead of the greatest priority number. Similarly, although the specific embodiment shows an indentation in the +x direction and an optional adjustment of a window's width to stay within a workspace upon indentation, it is contemplated that the method may be adapted by one skilled in the art to indent in other directions, say a +y direction or a diagonal direction (e.g. a combination of x and y), and to adjust other dimensions of a window as appropriate upon indentation, say its height if indentation is to be performed in the y direction, to keep within the workspace. Such adaptation and optimization, as well as others within the abilities of those of skills in the art, may be performed on the apparatus and methods disclosed herein without departing from the scope and spirit of the present invention. Consequently, the scope of the invention is not limited to the specific examples given herein but is set forth in the appended claims.

What is claimed is:

1. A computer implemented method for arranging windows in a workspace on a computer display screen, comprising:

assigning, using a central processing unit, a priority to each of a first plurality of windows in said workspace according a predefined criteria, an active window having the highest priority; and indenting by an indentation distance value associated with said each of said first plurality of windows from a predefined reference position in said workspace on said computer display screen said each of said first plurality of windows such that each of said first plurality of windows is indented by a different indentation distance that is determined in accordance with relative priorities of said first plurality of windows, the window having the lowest priority being positioned the closest to said predefined reference position, the window having the highest priority being positioned the furthest from said predefined reference position and in the visual foreground of said workspace on said computer display screen, wherein at least a portion of even one of said first plurality of windows is visible in said computer display screen.

2. The method of claim 1, further comprising:

ascertaining, using said central processing unit, a first overlap value associated with said each of said first plurality of windows; and computing, using said central processing unit, said indentation distance value associated with said each of said first plurality of windows using said first overlap value, said indentation distance value associated with said each of said first plurality of windows representing a distance said each of said first plurality of windows being indented from said predefined reference position.

3. The method of claim 2 wherein said active window represents a window most recently selected for operation.

4. The method of claim 3 wherein said workspace represents a predefined portion of said display screen within a window that is not in said first plurality of windows.

5. The method of claim 3 wherein said indenting step further includes the step of adjusting the boundaries of one of said first plurality of windows to keep said one of said first plurality of windows within said workspace on said computer display screen.

6. The method of claim 2, further comprising:

decrementing, using said central processing unit, responsive to a selection of a background window in said first plurality of windows a priority of each of a second plurality of windows, said each of said second plurality of windows being a window in said first plurality of windows and having a higher priority than a priority of said background window;

assigning, using said central processing unit, the highest priority to said background window;

reascertaining, using said central processing unit, said first overlap value for said each of said second plurality of windows;

computing, using said central processing unit, said indentation distance value associated with said each of said second plurality of windows using said first overlap value; and indenting each of said second plurality of windows from said predefined reference position in said workspace on said computer display screen by said indentation distance value, the window having the lowest priority being positioned the closest to said predefined reference position, the window having the highest priority being positioned the furthest from said predefined reference position and in the visual foreground of said workspace on said computer display screen.

7. The method of claim 6 wherein said subsequently selected window represents a window most recently selected for operation.

8. The method of claim 2 wherein a window is considered overlapped by another window if said window is physically overlapped by said another window.

9. The method of claim 2 wherein a window is considered overlapped by another window only if said window is logically overlapped by said another window.

10. The method of claim 9 wherein said window is logically overlapped only if a predefined critical area associated with said window is obstructed from view by said another window.

11. The method of claim 2 wherein said ascertaining step for a given window further comprises the steps of:

finding a first overlapped window whose priority is lower than a priority of said given window and having the highest overlap value among windows whose priorities are lower than the priority of said given window; and assigning said given window said first overlap value that is equal to the sum of an overlap value associated with said first overlapped window plus one.

12. A computer-implemented method for arranging windows in a workspace on a computer display screen, comprising:

assigning, using a digital computer, a priority to each of a plurality of windows in said workspace according to a predefined criteria; and arranging said plurality of windows in said workspace such that each of said first plurality of windows is indented by a different indentation distance that is determined in accordance with relative priorities of said plurality of windows such that a window of said plurality of windows having the lowest priority is placed the closest to a predefined reference position, a window of said plurality of windows having the highest priority is placed the furthest from said predefined reference position and in the visual foreground, wherein at least a portion of every one of said plurality of windows is unobstructed.

13. The method of claim 12 wherein said arranging step further comprises:

ascertaining an overlap value for said each of said plurality of windows, said overlap value associated with a given window of said plurality of windows representing the number of windows of said plurality of windows overlapped by said given window; and indenting from said predefined reference position said each of said plurality of windows by an indentation value associated with said each of said plurality of windows, said indentation value associated with said each of said plurality of windows being determined based on said overlap value associated with said each of said plurality of windows.

14. The method of claim 13 further comprising the step of reassigning, responsive to an addition of an additional window in said workspace, said priority of said each of said plurality of windows, said priority of said each of said plurality of windows after said addition being lower in priority than said priority of said each of said plurality of windows before said addition, wherein said additional window having the highest priority after said addition.

15. The method of claim 12 further comprising the step of reassigning, responsive to a deletion of a given window of said plurality of windows from said workspace, said priority of a first plurality of windows of said plurality of windows, said first plurality of windows being windows of said plurality of windows whose priorities are lower than a priority of said given window, wherein a priority of each of said first plurality of windows after said deletion being higher than a priority of said each of said first plurality of windows before deletion.

16. The method of claim 12 further comprising the step of reassigning, responsive to a selection of a given window of said plurality of windows, said priority of a first plurality of windows of said plurality of windows, said first plurality of windows being windows of said plurality of windows whose priorities are higher than a priority of said given window, wherein a priority of each of said first plurality of windows after said selection being lower than a priority of said each of said first plurality of windows before selection and said given window having the highest priority after selection.

17. An apparatus for arranging windows in a workspace on a computer display screen, comprising:
means for assigning a priority to each of a plurality of windows in said workspace according to a predefined criteria; and
means for arranging said plurality of windows in said workspace such that each of said first plurality of windows is indented by a different indentation distance that is determined in accordance with relative priorities of said plurality of windows such that a window of said plurality of windows having the lowest priority is placed the closest to a predefined reference position, a window of said plurality of windows having the highest priority is placed the furthest from said predefined reference position and in the visual foreground, wherein at least a portion of every one of said plurality of windows is unobstructed.

18. The apparatus of claim 17 wherein said arranging means further comprises:
means for ascertaining an overlap value for said each of said plurality of windows, said overlap value associated with a given window of said plurality of windows representing the number of windows of said plurality of windows overlapped by said given window;
means for indenting from said predefined reference position said each of said plurality of windows by an indentation value associated with said each of said plurality of windows, said indentation value associated with said each of said plurality of windows being determined based on said overlap value associated with said each of said plurality of windows.

19. The apparatus of claim 17 further comprising means for reassigning, responsive to an addition of an additional window in said workspace, said priority of said each of said plurality of windows, said priority of said each of said plurality of windows after said addition being lower in priority than said priority of said each of said plurality of windows before said addition, wherein said additional window having the highest priority after said addition.

20. The apparatus of claim 17 further comprising means for reassigning, responsive to a selection of a given window of said plurality of windows, said priority of a first plurality of windows of said plurality of windows, said first plurality of windows being windows of said plurality of windows whose priorities are higher than a priority of said given window, wherein a priority of each of said first plurality of windows after said selection being lower than a priority of said each of said first plurality of windows before selection and said given window having the highest priority after selection.

21. A computer-implemented method for arranging windows in a workspace on a computer display screen, comprising:
assigning, using a central processing unit, a priority to each of a first plurality of windows in said workspace according a predefined criteria; and
indenting by an indentation distance value associated with said each of said plurality of windows from a predefined reference position in said workspace on said computer display screen said each of said first plurality of windows, said indentation distance being different for each of said first plurality of windows and calculated based on said priority of said each of said first plurality of windows, an active window of said first plurality of windows being displayed in the visual foreground of said workspace on said computer display screen, wherein at least a rotation of every one of said plurality of windows is visible in said computer display screen.

22. The method of claim 21, further comprising:
decrementing, using said central processing unit, responsive to an addition of a new background window in said first plurality of windows a priority of each of said second plurality of windows, said each of said second plurality of windows being a window in said first plurality of windows prior to the addition of said new background window;
assigning, using said central processing unit, the highest priority to said new background window;
reascertaining, using said central processing unit, said first overlap value for said new background window;
computing, using said central processing unit, said indentation distance value associated with said new background window using said first overlap value; and
indenting said new background window from said predefined reference position in said workspace on said computer display screen by said indentation distance value, said new background window having the highest priority is positioned the furthest from said predefined reference position and in the visual foreground of said workspace on said computer display screen.

23. The method of claim 21, further comprising:
incrementing, using said central processing unit, responsive to a deletion of a window in said first plurality of windows a priority of each of a second plurality of windows, said each of said second plurality of windows being a window in said first plurality of windows and having a lower priority than a priority of said deleted window prior to deletion;
reascertaining, using said central processing unit, said first overlap value for said each of a third plurality of windows, said each of said third plurality of windows being a window in said first plurality of windows and having a higher priority than a priority of said deleted window prior to deletion;

computing, using said central processing unit, said indentation distance value associated with said each of said third plurality of windows using said first overlap value; and indenting each of said third plurality of windows from said predefined reference position in said workspace on said computer display screen by said indentation distance value, the window having the lowest priority being positioned the closest to said predefined reference position, the window having the highest priority being positioned the furthest from said predefined reference position and in the visual foreground of said workspace on said computer display screen.

* * * * *